US012240083B2

(12) United States Patent

Zhao

(10) Patent No.: US 12,240,083 B2

(45) Date of Patent: Mar. 4, 2025

(54) POWER TOOL AND IMPACT DRIVER

(71) Applicant: MAKITA CORPORATION, Anjo (JP)

(72) Inventor: Ding Zhao, Anjo (JP)

(73) Assignee: MAKITA CORPORATION, Anjo (JP)

( * ) Notice: Subject to any disclaimer, the term of this patent is extended or adjusted under 35 U.S.C. 154(b) by 147 days.

(21) Appl. No.: 17/811,124

(22) Filed: Jul. 7, 2022

(65) Prior Publication Data

US 2023/0036348 A1 Feb. 2, 2023

(30) Foreign Application Priority Data

Jul. 29, 2021 (JP) ................................ 2021-124477
Nov. 11, 2021 (JP) ................................ 2021-183781

(51) Int. Cl.
*B25B 21/02* (2006.01)

(52) U.S. Cl.
CPC .................................... *B25B 21/02* (2013.01)

(58) Field of Classification Search
CPC ....... B25B 21/02; B25B 23/16; B25D 11/064; B25D 11/06; B25D 17/245; B25D 17/24
USPC ........ 173/170, 114, 117, 202, 212, 128, 1, 2
See application file for complete search history.

(56) References Cited

U.S. PATENT DOCUMENTS 8,313,012 B2 * 11/2012 Shima ....................... B25C 1/06 227/129
9,643,300 B2 5/2017 Kumagai et al.
9,707,671 B2 * 7/2017 Shi ....................... B25B 23/147
9,954,418 B2 * 4/2018 Kawakami ............ B24B 23/028
10,213,907 B2 2/2019 Kumagai et al.
11,045,926 B2 6/2021 Kumagai et al.
2005/0121209 A1 * 6/2005 Shimizu .................. B25B 21/00 173/217
2007/0144270 A1 * 6/2007 Crass .................. B25B 23/1425 73/862.21
2009/0229842 A1 * 9/2009 Gray ......................... B25F 5/02 173/217
2011/0180286 A1 * 7/2011 Oomori ..................... H02K 9/06 173/217
2012/0000755 A1 * 1/2012 Kumagai .................. B25F 5/02 200/293.1

(Continued)

FOREIGN PATENT DOCUMENTS

JP 2006281414 A 10/2006
JP 2010228041 A 10/2010

(Continued)

*Primary Examiner* — Dariush Seif

(74) *Attorney, Agent, or Firm* — J-TEK LAW PLLC; Jeffrey D. Tekanic; Scott T. Wakeman

(57) ABSTRACT

A power tool includes: a motor having a rotor, which rotates about a motor rotational axis extending in a front-rear direction; an output part, which is disposed more forward than the motor and is rotated in response to rotation of the rotor; a housing including: a motor-housing part, which houses the motor; a grip part, which extends downward from the motor-housing part; a battery-holding part, which is connected to a lower-end portion of the grip part; a control circuit board, which is housed in the housing; and an operation-and-display part, which is disposed at a rear portion of the housing and is electrically connected to the control circuit board.

20 Claims, 14 Drawing Sheets

(56) References Cited

U.S. PATENT DOCUMENTS

2012/0100405 A1* 4/2012 Noda ................ H01M 10/4257 429/90
2012/0279736 A1* 11/2012 Tanimoto .............. B25B 21/026 173/117
2012/0292070 A1* 11/2012 Ito .......................... H02K 11/33 173/217
2013/0014967 A1 1/2013 Ito et al.
2013/0062086 A1 3/2013 Ito et al.
2013/0207491 A1 8/2013 Hatfield et al.
2013/0271054 A1* 10/2013 Watanabe ................. B25F 5/00 318/490
2014/0158390 A1* 6/2014 Mashiko ............... B25B 23/147 173/217
2014/0182869 A1* 7/2014 Kumagai ................ B25B 21/02 173/93
2014/0371018 A1* 12/2014 Ito ............................ H02K 9/06 475/149
2015/0279592 A1 10/2015 Ekstrom et al.
2015/0280532 A1* 10/2015 Mizutani .................. H02K 7/14 310/50
2015/0343617 A1* 12/2015 Kondo .................... B25B 21/02 173/93
2016/0121466 A1* 5/2016 Kiyohara ............ F21V 33/0084 362/120
2017/0151657 A1* 6/2017 Nagasaka .............. H01H 13/08
2017/0203418 A1 7/2017 Kumagai et al.
2017/0326720 A1* 11/2017 Kuroyanagi ............ B25F 5/021
2018/0222022 A1* 8/2018 Kumagai ............. B25D 11/104
2019/0143491 A1 5/2019 Kumagai et al.
2020/0039044 A1* 2/2020 Akiba ....................... B25C 1/06
2020/0139519 A1* 5/2020 Banba ....................... B25F 5/02
2020/0176736 A1* 6/2020 Taga ..................... H01M 50/24
2020/0176834 A1* 6/2020 Murakami .......... H01M 10/613
2021/0276164 A1 9/2021 Kumagai et al.
2023/0036348 A1* 2/2023 Zhao ....................... B25B 21/02

FOREIGN PATENT DOCUMENTS

JP 2012139783 A 7/2012
JP 6613401 B2 12/2019
JP 6724563 B2 7/2020
JP 2021037561 A 3/2021
WO 2009145205 A1 12/2009

* cited by examiner

POWER TOOL AND IMPACT DRIVER

CROSS-REFERENCE TO RELATED APPLICATION

This application claims priority to Japanese patent application no. 2021-124477 filed on Jul. 29, 2021, and to Japanese patent application no. 2021-183781 filed on Nov. 11, 2021, the contents of which are fully incorporated herein by reference.

TECHNICAL FIELD

Techniques disclosed in the present specification relate to a power tool and an impact driver.

BACKGROUND ART

Japanese Laid-open Patent Publication Nos. 2006-281414, 2010-228041, and 2021-037561, as well as Japanese Patent Nos. 6613401 and 6724563, disclose power tools related to the present teachings.

SUMMARY OF THE INVENTION

Some known power tools include an operation-and-display part. Depending on the location of the operation-and-display part, there is a possibility that ease of operation and visibility might be impaired. In addition or in the alternative, depending on the location of the operation-and-display part, there is a possibility that the power tool will not have an optimal weight balance.

It is one non-limiting object of the present teachings to disclose techniques for providing an operation-and-display part on a power tool to improve ease of operation and visibility thereof. In addition or in the alternative, it is one non-limiting object of the present teachings to disclose techniques for improving the weight balance of the power tool.

In one non-limiting aspect of the present teachings, a power tool may comprise: a motor comprising a rotor, which rotates about a motor rotational axis extending in a front-rear direction; an output part, which is disposed more forward than the motor and is rotated by the rotational force of the rotor; a housing comprising: a motor-housing part, which houses the motor; a grip part, which extends downward from the motor-housing part; and a battery-holding part, which is connected to a lower-end portion of the grip part; a control circuit board, which is housed in the housing; and an operation-and-display part, which is disposed at a rear portion of the housing and is connected to the control circuit board.

In such a power tool, ease of operation and visibility of an operation-and-display part provided on a power tool can be improved. In addition, the weight balance of the power tool can be improved.

DETAILED DESCRIPTION OF THE INVENTION

Figure 1:
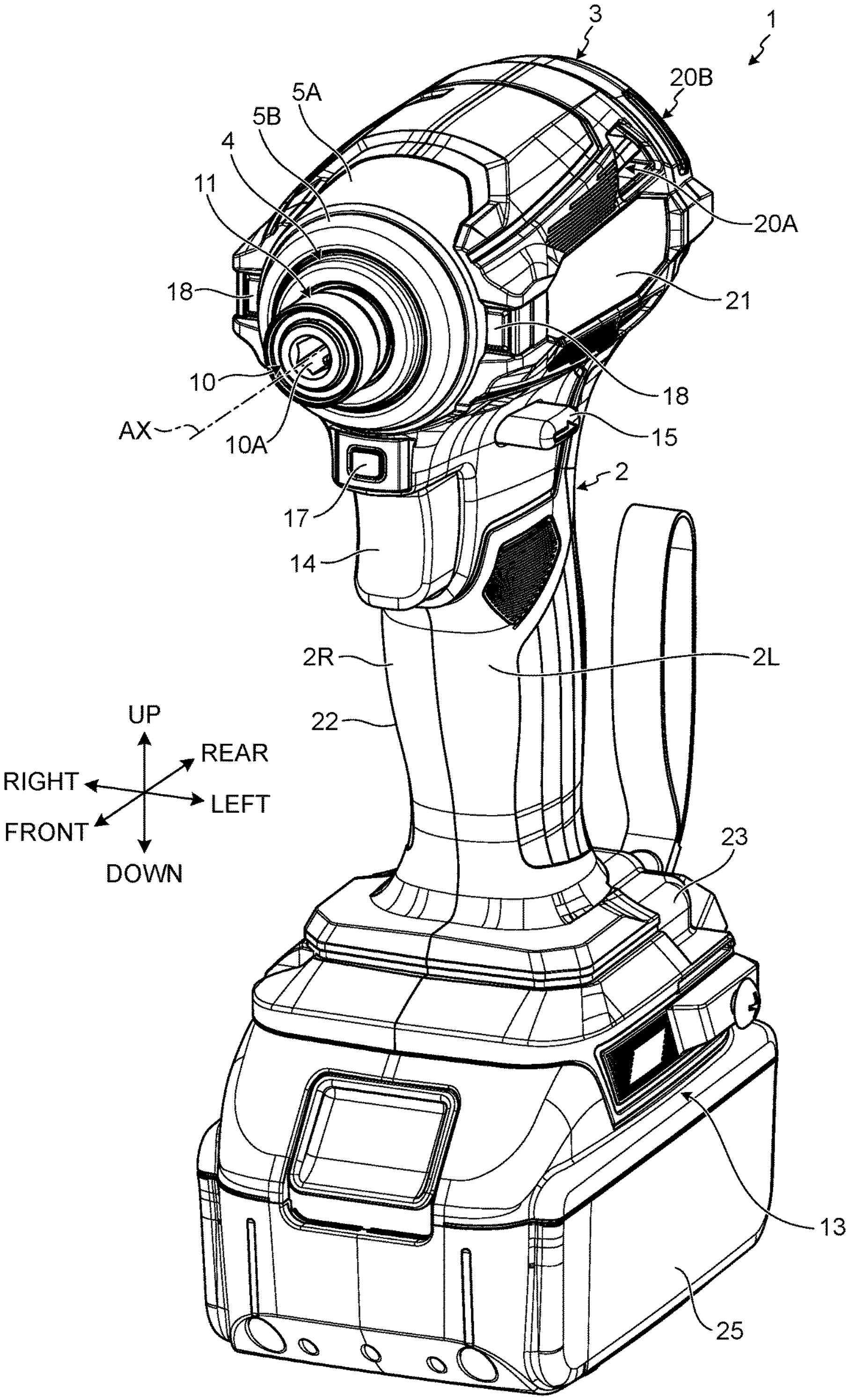
FIG. 1 is an oblique view, viewed from the front, that shows a power tool according to one embodiment, which is representative of the present teachings.

In one or more embodiments, a power tool may comprise: a motor comprising a rotor, which rotates about a motor rotational axis extending in a front-rear direction; an output part, which is disposed more forward than the motor and is rotated by the rotational force of the rotor; a housing comprising: a motor-housing part, which houses the motor; a grip part, which extends downward from the motor-housing part; and a battery-holding part, which is connected to a lower-end portion of the grip part; a control circuit board, which is housed in the housing; and an operation-and-display part, which is disposed at a rear portion of the housing and is connected to the control circuit board.

With regard to the above-mentioned configuration, because the operation-and-display part is disposed at a rear portion of the housing, a user can manipulate and view the operation-and-display part while the front portion of the power tool is oriented toward the work object (workpiece). That is, while in a working posture in which the user uses the power tool in the state in which the user grips the grip part with one hand, the user can view the operation-and-display part and manipulate (e.g., press one or more buttons on) the operation-and-display part with the other hand without pulling the power tool rearward. Consequently, ease of operation and visibility of the operation-and-display part can be improved. In addition, because the operation-and-display part is disposed at a rear portion of the housing, there is no need to provide a region on the front portion of the housing for the operation-and-display part. Accordingly, the weight balance of the power tool can be improved.

In one or more embodiments, the operation-and-display part may be disposed at a rear portion of the battery-holding part.

With regard to the above-mentioned configuration, because the operation-and-display part is disposed at a rear portion of the battery-holding part, a user can manipulate and view the operation-and-display part while the front portion of the power tool is oriented toward the work object. In addition, because the operation-and-display part is disposed at a rear portion of the battery-holding part, there is no need to provide a region on the front portion of the battery-holding part for the operation-and-display part. Accordingly, the weight balance of the power tool can be improved.

In one or more embodiments, the operation-and-display part may be disposed in a recessed part, which is provided on the battery-holding part.

With regard to the above-mentioned configuration, because the operation-and-display part does not protrude from the surface of the battery-holding part, the user can easily handle the power tool.

In one or more embodiments, in a left-right direction, the center of the operation-and-display part and the center of the battery-holding part may coincide.

With regard to the above-mentioned configuration, the weight balance of the power tool in the left-right direction can be improved. In addition, the ease of operation and the visibility of the operation-and-display part can be improved.

In one or more embodiments, the dimension of the operation-and-display part in the left-right direction may be larger than the dimension of the operation-and-display part in an up-down direction.

With regard to the above-mentioned configuration, because the shape of the operation-and-display part is elongated in the left-right direction, ease of operation and visibility of the operation-and-display part can be improved.

In one or more embodiments, the operation-and-display part may be disposed more rearward than a rear-end part of the grip part.

With regard to the above-mentioned configuration, the weight balance of the power tool in the front-rear direction can be improved. In addition, the ease of operation and the visibility of the operation-and-display part can be improved.

In one or more embodiments, the operation-and-display part may be disposed more rearward than the rear-end part of the motor-housing part.

With regard to the above-mentioned configuration, the weight balance of the power tool in the front-rear direction can be improved. In addition, the ease of operation and the visibility of the operation-and-display part can be improved.

In one or more embodiments, the control circuit board may be housed in the battery-holding part.

With regard to the above-mentioned configuration, the distance between the operation-and-display part and the control circuit board is shortened. Consequently, the size and complexity of the connection structure between the operation-and-display part and the control circuit board can be minimized.

In one or more embodiments, a rear-end part of the control circuit board may disposed more rearward than the rear-end part of the grip part.

With regard to the above-mentioned configuration, the weight balance of the power tool in the front-rear direction can be improved.

In one or more embodiments, the operation-and-display part may be disposed more rearward than the control circuit board.

With regard to the above-mentioned configuration, because the operation-and-display part and the control circuit board do not overlap, the size of the battery-holding part can be minimized, and the weight balance of the power tool can be improved.

In one or more embodiments, a surface of the operation-and-display part may tilt downward as it goes rearward.

With regard to the above-mentioned configuration, ease of operation and visibility of the operation-and-display part can be improved.

In one or more embodiments, the operation-and-display part may comprise: a circuit board; one or more switch devices, which is (are) installed on the circuit board; one or more light-emitting devices, which is (are) installed on the circuit board; a spacer member (spacer), which supports the circuit board; and a label member (label), which covers the switch device and the light-emitting device.

With regard to the above-mentioned configuration, the size of the operation-and-display part need not be increased. In addition, ease of operation and visibility of the operation-and-display part can be improved.

In one or more embodiments, the circuit board may be fixed to at least a portion of the housing via the spacer member.

With regard to the above-mentioned configuration, the attachment of the operation-and-display part to the housing is stabilized.

In one or more embodiments, the surface of the circuit board may tilt downward as it goes rearward.

With regard to the above-mentioned configuration, the size of the operation-and-display part need not be increased. In addition, ease of operation and visibility of the operation-and-display part can be improved.

In one or more embodiments, the surface of the control circuit board may be parallel to the motor rotational axis.

With regard to the above-mentioned configuration, because the circuit board and the control circuit board are disposed such that they are oriented in differing directions, the size of the power tool need not be increased.

In one or more embodiments, the power tool may comprise one or more lead wires that electrically connect(s) the control circuit board and the circuit board.

With regard to the above-mentioned configuration, an operation signal or operation signals, which is (are) generated by, for example, the operation-and-display part being manipulated (e.g., pressing buttons thereon), is (are) transmitted to the control circuit board via the lead wire(s).

In one or more embodiments, the control circuit board may comprise: a storage part, which stores software for executing a plurality of application modes of the motor. By manipulating (e.g., pressing) one or more manipulatable parts (e.g., one or more buttons) of (on) the operation-and-display part, an instruction-output part outputs a mode instruction that sets the application mode. A motor-control part (e.g., a controller such as a microprocessor) controls the motor based on the mode instruction. A display-control part (e.g., one or more video drivers electrically connected to the controller) controls a display part of the operation-and-display part based on the mode instruction.

With regard to the above-mentioned configuration, the application mode of the motor is set by manipulating the manipulatable part(s) of the operation-and-display part. In addition, the display part of the operation-and-display part are controlled based on the mode instruction, and thereby the user can view the application mode of the motor by looking at the display part.

In one or more embodiments, in the front-rear direction, a first distance between a front-end part of a lower-end portion of the grip part and a front-end part of the battery-holding part may be shorter than or equal to a second distance between a rear-end part of a lower-end portion of the grip part and a rear-end part of the battery-holding part.

With regard to the above-mentioned configuration, because the grip part is disposed at substantially the center of the battery-holding part in the front-rear direction, the weight balance of the power tool in the front-rear direction can be improved.

In one or more embodiments, the power tool may comprise: a battery-mounting part, which is disposed at a lower portion of the battery-holding part. A battery pack, which is inserted from forward of the battery-holding part, may be mounted on the battery-mounting part.

With regard to the above-mentioned configuration, the user can easily mount the battery pack on the battery-mounting part. In addition, when the battery pack is mounted on the battery-mounting part, the weight balance of the power tool in the front-rear direction is improved.

Embodiment

A representative, non-limiting embodiment of the present teachings will now be explained, with reference to the drawings. In the embodiment, the positional relationships among the various parts are explained using the terms left, right, front, rear, up, and down. These terms indicate relative positions or directions, with reference to the center of a power tool 1. The power tool 1 comprises a motor 6, which serves as the power source.

In the embodiment, the direction parallel to a motor rotational axis AX of the motor 6 is called the axial direction where appropriate, the direction that goes around motor rotational axis AX is called the circumferential direction or the rotational direction where appropriate, and the radial direction of motor rotational axis AX is called the radial direction where appropriate.

Motor rotational axis AX extends in the front-rear direction. One side in the axial direction is forward, and the other side in the axial direction is rearward. In addition, in the radial direction, the direction that is located close to or that approaches motor rotational axis AX is called "radially inward" or "inward in a (the) radial direction" where appropriate, and the direction that is located distant from or leads away from motor rotational axis AX is called "radially outward" or "outward in a (the) radial direction" where appropriate.

<Power Tool>

Figure 2:
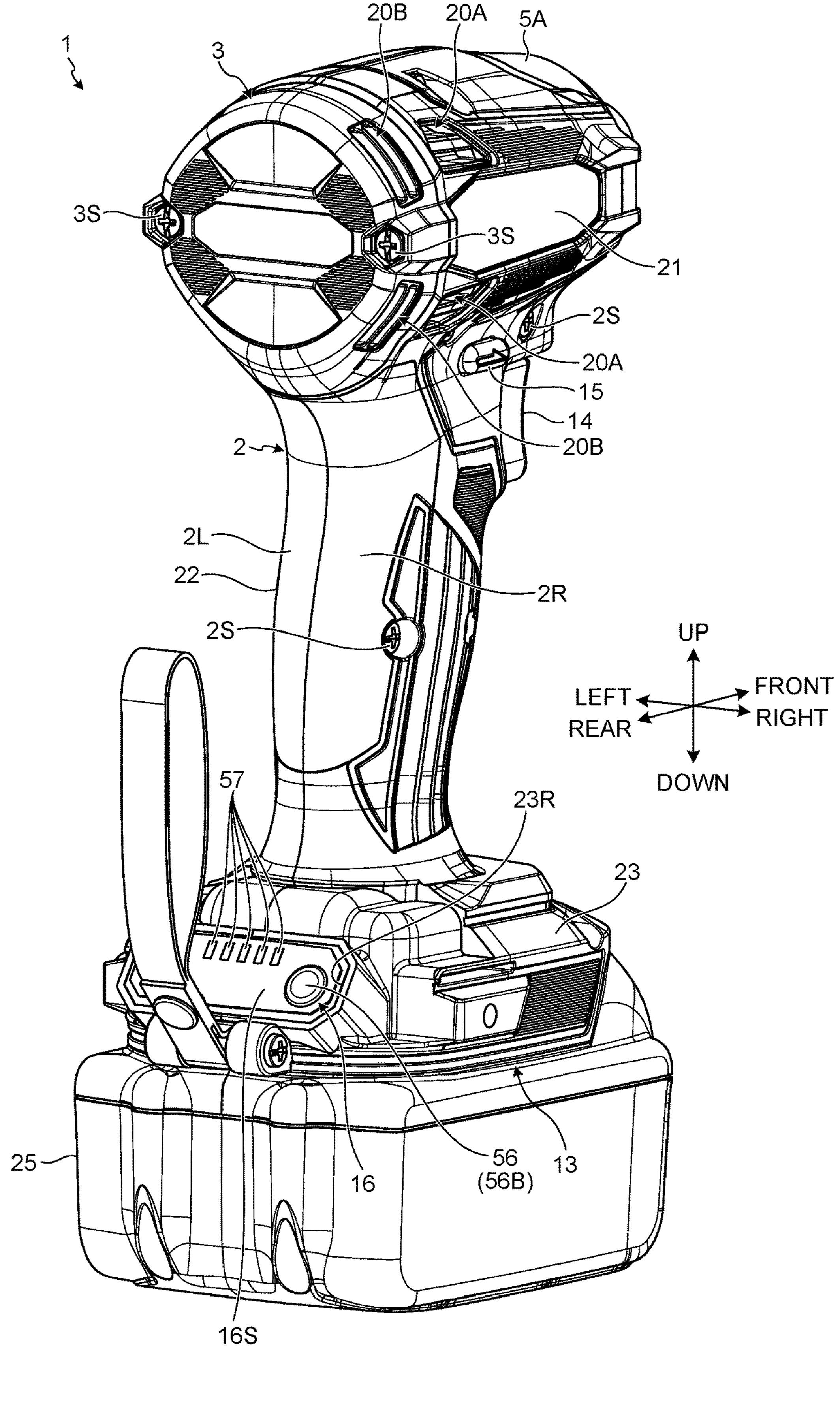
FIG. 2 is an oblique view, viewed from the rear, that shows the power tool according to the embodiment.
Figure 3:
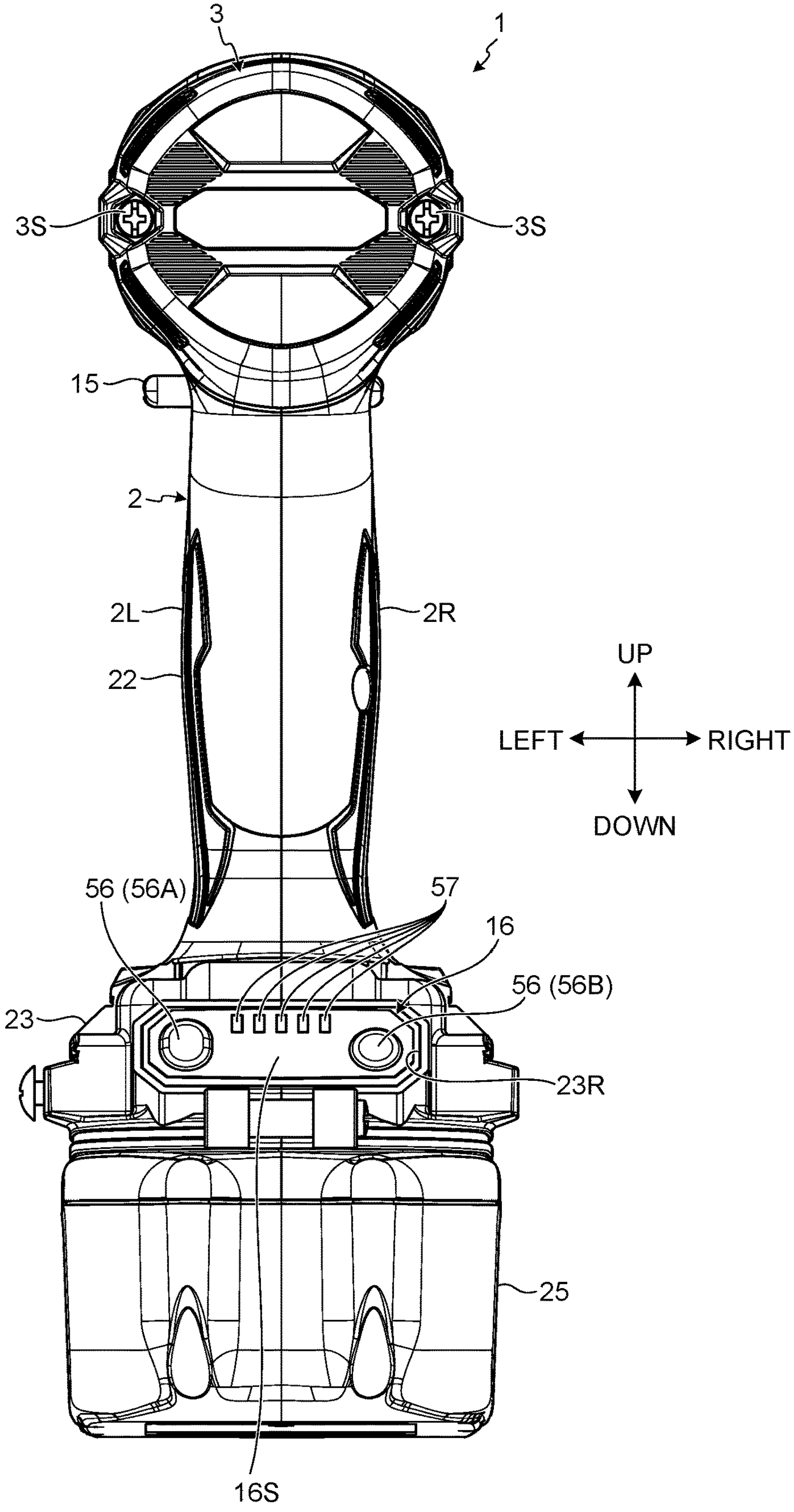
FIG. 3 is a rear view that shows the power tool according to the embodiment.
Figure 4:
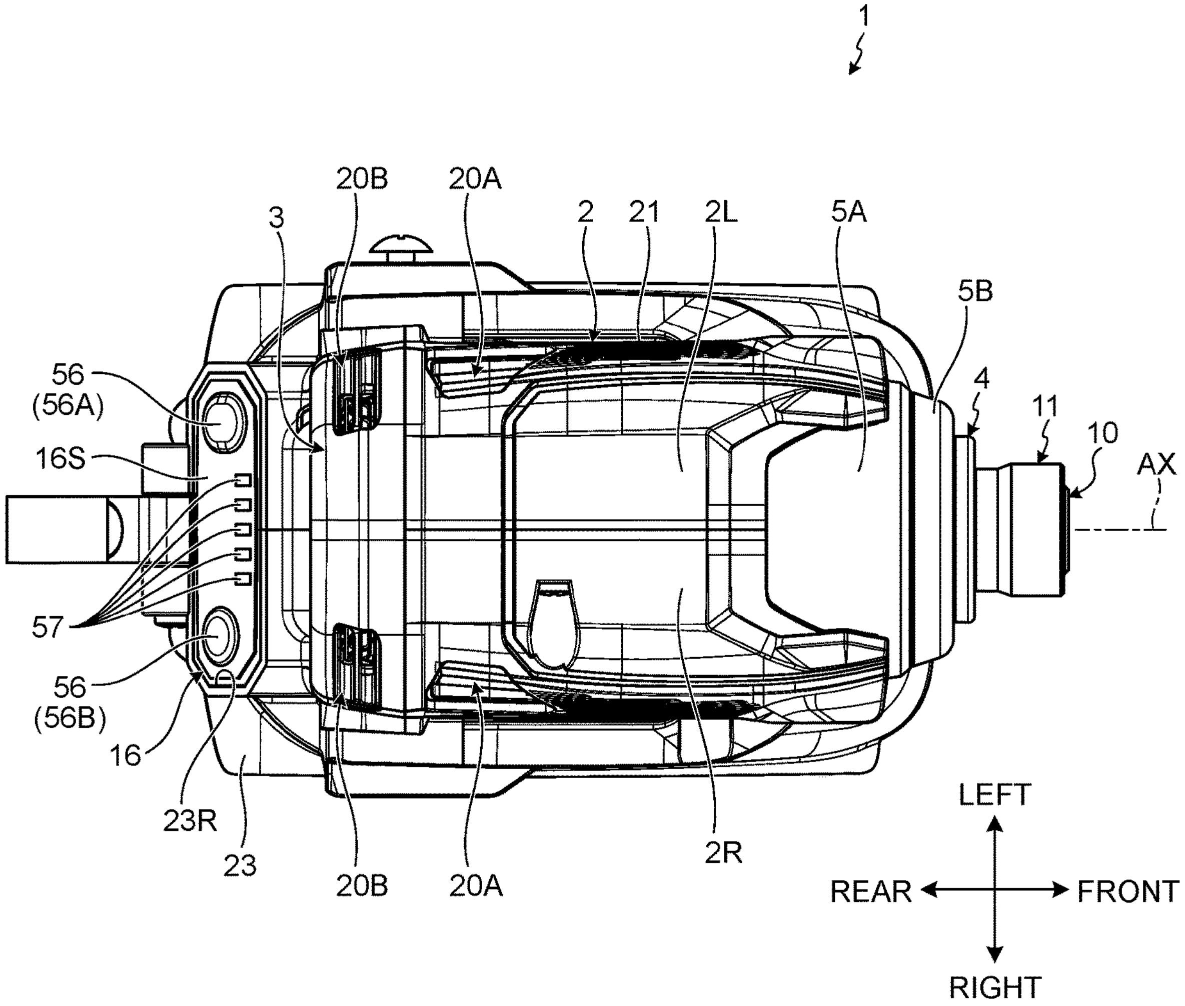
FIG. 4 is a top view that shows the power tool according to the embodiment.
Figure 5:
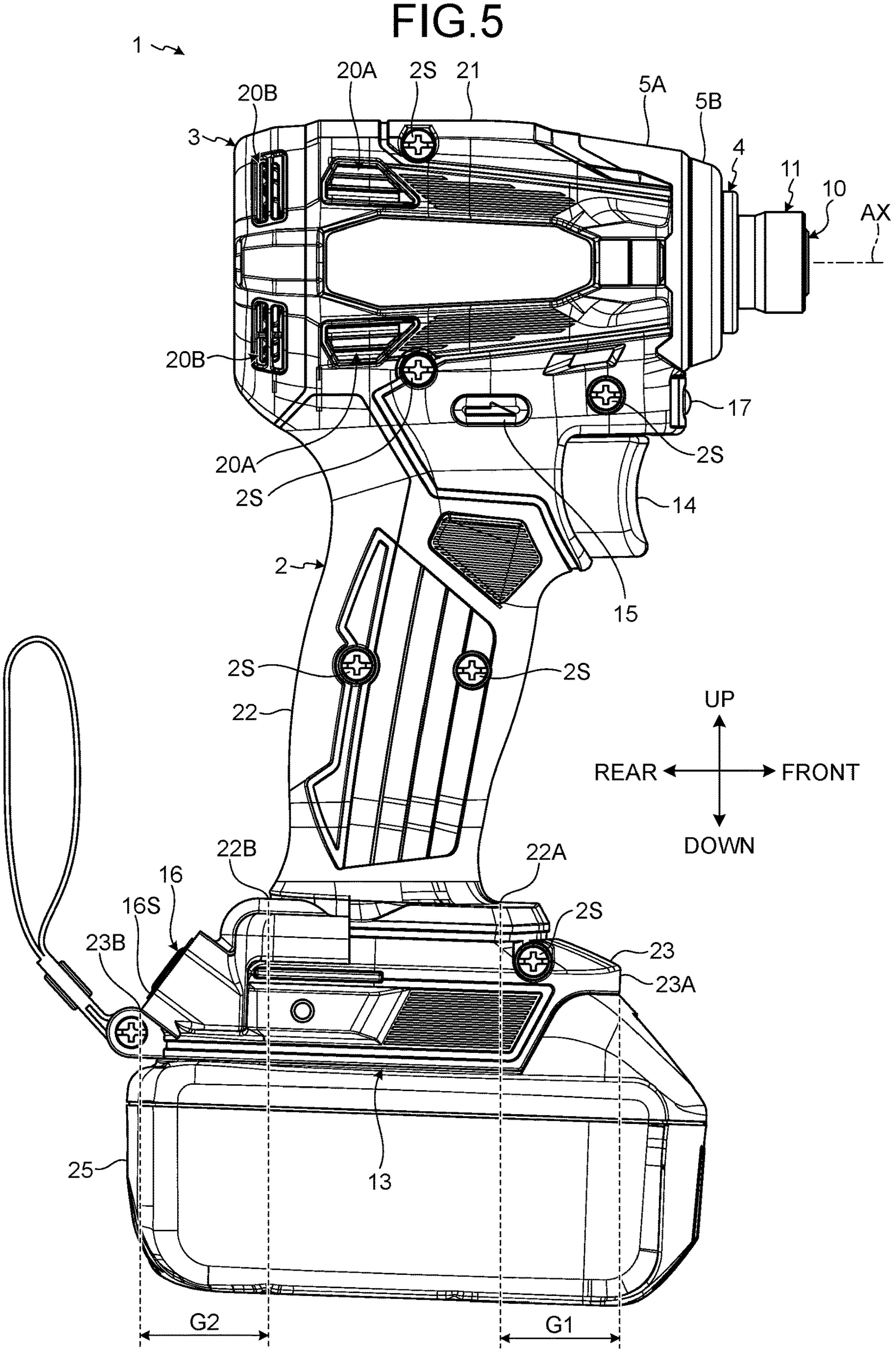
FIG. 5 is a right view that shows the power tool according to the embodiment.
Figure 6:
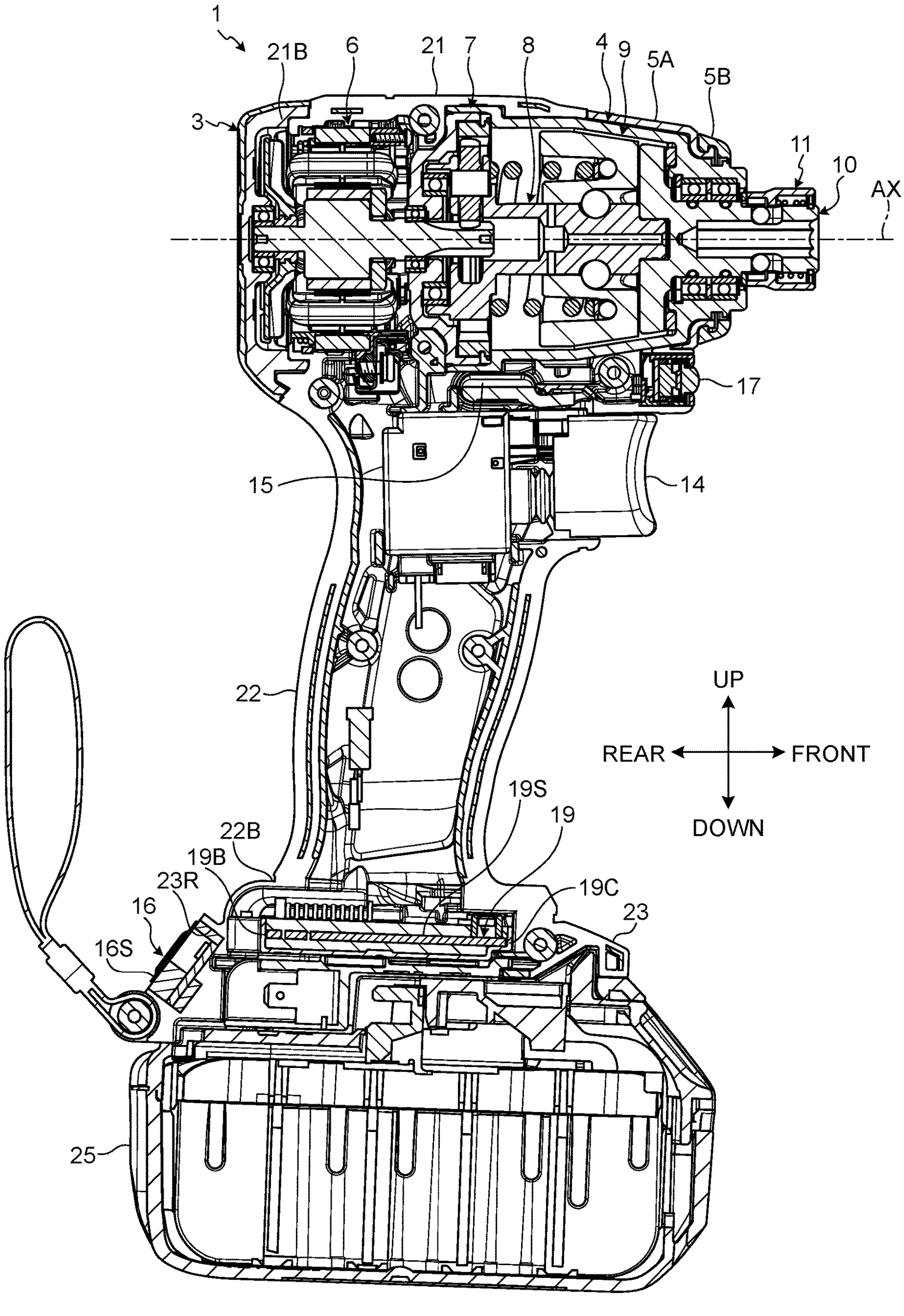
FIG. 6 is a longitudinal, cross-sectional view that shows the power tool according to the embodiment.
Figure 7:
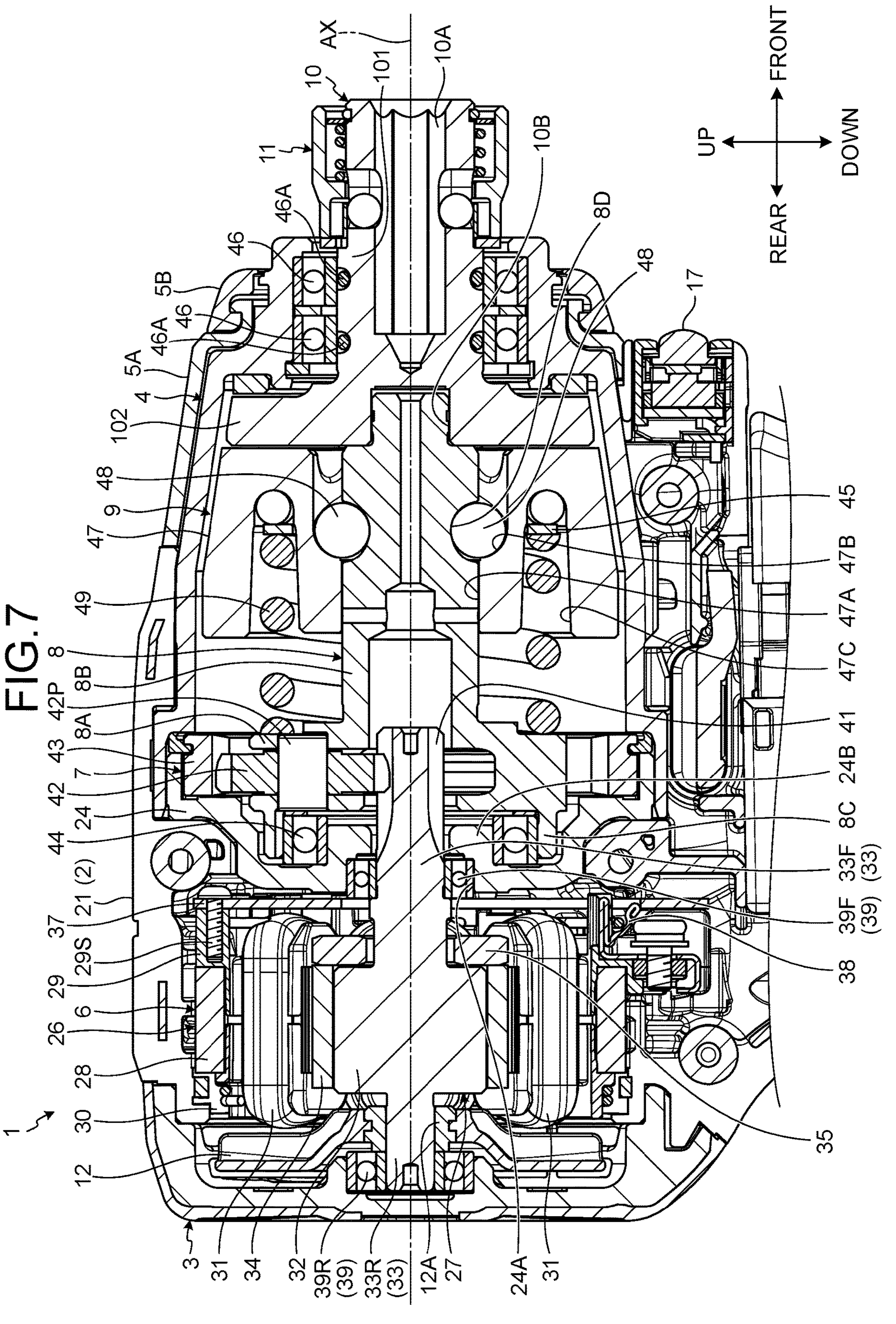
FIG. 7 is a longitudinal, cross-sectional view that shows an upper portion of the power tool according to the embodiment.
Figure 8:
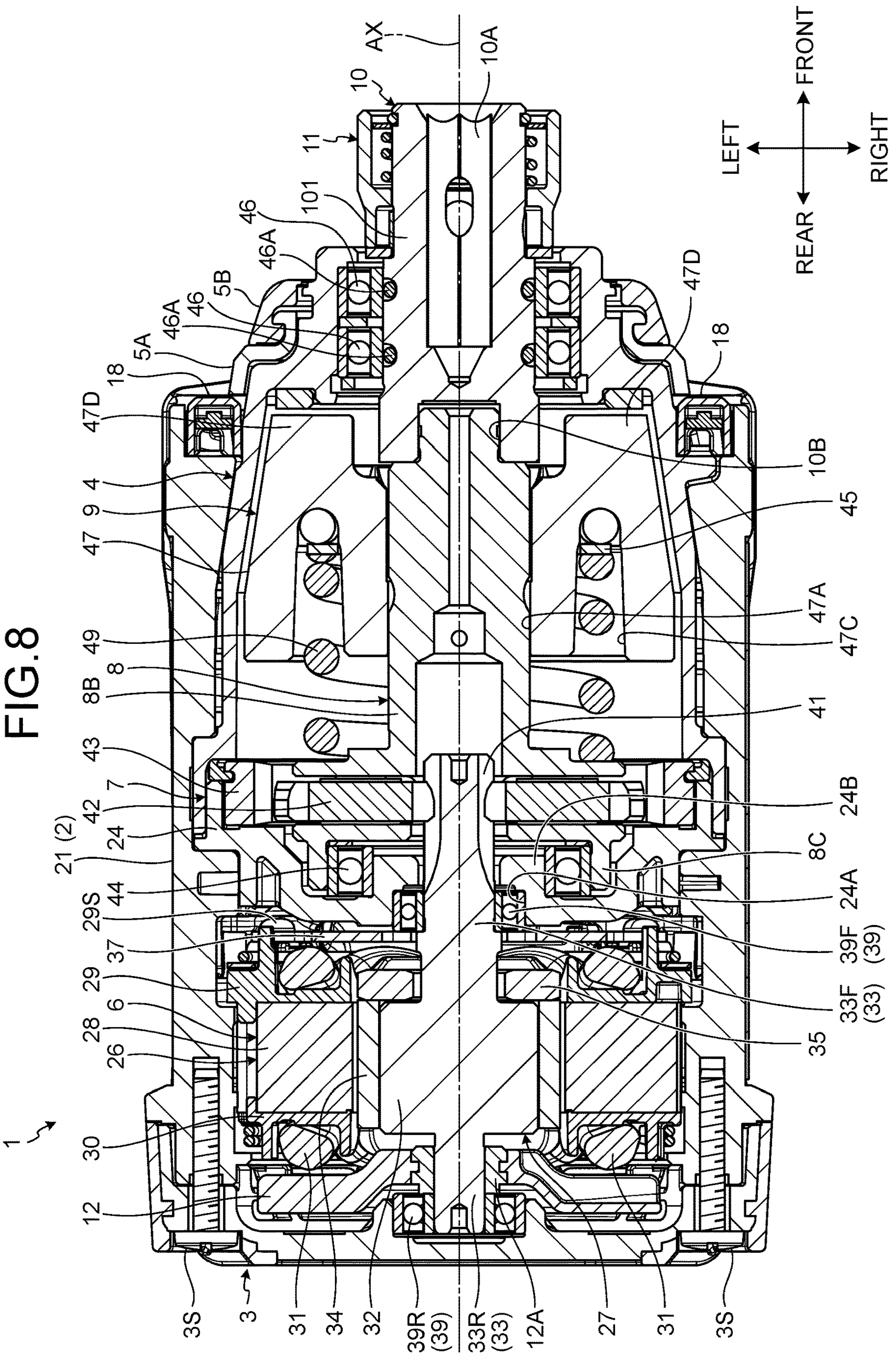
FIG. 8 is a transverse, cross-sectional view that shows an upper portion of the power tool according to the embodiment.

FIG. 1 is an oblique view, viewed from the front, that shows the power tool 1 according to the representative, non-limiting embodiment of the present teachings. FIG. 2 is an oblique view, viewed from the rear, that shows the power tool 1. FIG. 3 is a rear view that shows the power tool 1. FIG. 4 is a top view that shows the power tool 1. FIG. 5 is a right view that shows the power tool 1. FIG. 6 is a longitudinal, cross-sectional view that shows the power tool 1. FIG. 7 is a longitudinal, cross-sectional view that shows an upper portion of the power tool 1. FIG. 8 is a transverse, cross-sectional view that shows an upper portion of the power tool 1.

In the embodiment, the power tool 1 is an impact driver, which is one type of screw-tightening tool. The power tool 1 comprises a housing 2, a rear cover 3, a hammer case 4, a hammer-case cover 5A, a bumper 5B, the motor 6, a speed-reducing mechanism 7, a spindle 8, an impact (hammer) mechanism 9, an anvil 10, a tool-holding mechanism 11, a fan 12, a battery-mounting part 13, a trigger lever 14, a forward/reverse change lever (reversing lever or reversing switch lever) 15, an operation-and-display part 16, a mode-change switch 17, light assemblies 18, and a control circuit board 19.

The housing 2 is made of a synthetic resin (polymer). In the embodiment, the housing 2 is made of a nylon (polyamide). The housing 2 comprises a left housing 2L and a right housing 2R, which is disposed rightward of the left housing 2L. The left housing 2L and the right housing 2R are fixed to one another by a plurality of screws 2S. The housing 2 comprises a pair of half housings.

The housing 2 comprises a motor-housing part 21, a grip part 22, and a battery-holding part 23.

The motor-housing part 21 has a tube shape. The motor-housing part 21 houses the motor 6. The motor-housing part 21 houses at least a portion of the hammer case 4.

The grip part 22 extends downward from the motor-housing part 21. The trigger lever 14 is provided at an upper portion of the grip part 22. The grip part 22 is gripped by a user.

The battery-holding part 23 is connected to a lower-end portion of the grip part 22. In both the front-rear direction and the left-right direction, the dimension of the outer shape of the battery-holding part 23 is larger than the dimension of the outer shape of the grip part 22.

The rear cover 3 is made of a synthetic resin (polymer), e.g., a nylon (polyamide). The rear cover 3 is disposed rearward of the motor-housing part 21. The rear cover 3 houses at least a portion of the fan 12. The fan 12 is disposed on the inner-circumference side of the rear cover 3. The rear cover 3 is disposed such that it covers an opening in a rear-end part of the motor-housing part 21. The rear cover 3 is fixed to a rear-end part of the motor-housing 21 via two screws 3S.

The motor-housing part 21 has air-intake ports 20A. The rear cover 3 has air-exhaust ports 20B. Air from outside of the housing 2 flows into the interior space of the housing 2 via the air-intake ports 20A. Air from the interior space of the housing 2 flows out to the outside of the housing 2 via the air-exhaust ports 20B.

The hammer case 4 is made of a metal. In the embodiment, the hammer case 4 is made of aluminum. The hammer case 4 has a tube shape. The hammer case 4 is connected to a front portion of the motor-housing part 21. A bearing box 24 is fixed to a rear portion of the hammer case 4. A screw thread is formed on an outer-circumferential portion of the bearing box 24. A thread groove is formed on an inner-circumferential portion of the hammer case 4. By joining (threadably engaging) the screw thread of the bearing box 24 and the thread groove of the hammer case 4, the bearing box 24 and the hammer case 4 are fixed to one another. The hammer case 4 is sandwiched between the left housing 2L and the right housing 2R. At least a portion of the hammer case 4 is housed in the motor-housing part 21. The bearing box 24 is fixed to the motor-housing part 21 and the hammer case 4.

The hammer case 4 houses the speed-reducing mechanism 7, the spindle 8, the impact mechanism 9, and at least a portion of the anvil 10. At least a portion of the speed-reducing mechanism 7 is disposed on the inner side of the bearing box 24. The speed-reducing mechanism 7 comprises a plurality of gears, as will be further explained below.

The hammer-case cover 5A covers at least a portion of the surface of the hammer case 4. The hammer-case cover 5A protects the hammer case 4. The hammer-case cover 5A blocks (shields) contact between the hammer case 4 and objects around the periphery of the hammer case 4.

The bumper 5B is disposed at a front portion of the hammer case 4. The bumper 5B has a circular-ring shape. The bumper 5B curtails contact between the hammer case 4 and objects around the hammer case 4. The bumper 5B mitigates the impact that occurs when an object is contacted.

The motor 6 is the power source (prime mover) of the power tool 1. The motor 6 is an inner-rotor-type brushless motor. The motor 6 comprises a stator 26 and a rotor 27. The stator 26 is fixed to the motor-housing part 21. At least a portion of the rotor 27 is disposed in the interior of the stator 26. The rotor 27 rotates relative to the stator 26. The rotor 27 rotates about motor rotational axis AX, which extends in the front-rear direction.

The stator 26 comprises a stator core 28, a front insulator 29, a rear insulator 30, and coils 31.

The stator core 28 is disposed outward in the radial direction of the rotor 27. The stator core 28 comprises a plurality of laminated steel sheets. The steel sheets are sheets made of a metal whose main component is iron. The stator core 28 has a tube shape. The stator core 28 comprises teeth, which respectively support the coils 31.

The front insulator 29 is provided at a front portion of the stator core 28. The rear insulator 30 is provided at a rear portion of the stator core 28. The front insulator 29 and the rear insulator 30 each are an electrically insulating member made of a synthetic resin (polymer). The front insulator 29 is disposed such that it covers some of the teeth surfaces. The rear insulator 30 is disposed such that it covers some of the teeth surfaces.

The coils 31 are mounted on the stator core 28 via the front insulator 29 and the rear insulator 30. The coils 31 are disposed via the front insulator 29 and the rear insulator 30 and around the teeth of the stator core 28. The coils 31 and the stator core 28 are electrically insulated from one another by the front insulator 29 and the rear insulator 30. The coils 31 are electrically connected to lead wires via fusing terminals 38. The coils 31 are electrically connected to the control circuit board 19 via lead wires (not shown).

The rotor 27 rotates about motor rotational axis AX. The rotor 27 comprises a rotor-core part 32, a rotor-shaft part 33, at least one rotor magnet 34, and at least one magnet 35 for sensing.

The rotor-core part 32 and the rotor-shaft part 33 each are made of steel. The rotor-shaft part 33 protrudes in the front-rear direction from end surfaces of the rotor-core part 32. The rotor-shaft part 33 comprises a front-side shaft part 33F, which protrudes forward from a front-end surface of the rotor-core part 32, and a rear-side shaft part 33R, which protrudes rearward from a rear-end surface of the rotor-core part 32.

The rotor magnet 34 is fixed to the rotor-core part 32. The rotor magnet 34 has a circular-tube shape. The rotor magnet 34 is disposed around the rotor-core part 32.

The magnet 35 for sensing is fixed to the rotor-core part 32. The magnet 35 for sensing has a circular-ring shape. The magnet 35 for sensing is disposed on the front-end surface of the rotor-core part 32 and the front-end surface of the rotor magnet 34.

A sensor board 37 is mounted on the front insulator 29. The sensor board 37 is fixed to the front insulator 29 by at least one screw 29S. The sensor board 37 comprises: a circuit board, which has a disk shape and in which a hole is provided at the center; and a rotation-detection device, which is supported by the circuit board. At least a portion of the sensor board 37 opposes the magnet 35 for sensing. The rotation-detection device detects the position of the rotor 27 in the rotational direction by detecting the position of the magnet 35 for sensing of the rotor 27.

The rotor-shaft part 33 is supported in a rotatable manner by rotor bearings 39. The rotor bearings 39 comprise: a front-side rotor bearing 39F, which supports the front-side shaft part 33F in a rotatable manner; and a rear-side rotor bearing 39R, which supports the rear-side shaft part 33R in a rotatable manner.

The front-side rotor bearing 39F is held by the bearing box 24. The bearing box 24 has a recessed part 24A, which is recessed forward from a rear surface of the bearing box 24. The front-side rotor bearing 39F is disposed in the recessed part 24A. The rear-side rotor bearing 39R is held by the rear cover 3. A front-end portion of the rotor-shaft part 33 is disposed in the interior space of the hammer case 4 through an opening in the bearing box 24.

A pinion gear 41 is formed at a front-end portion of the rotor-shaft part 33. The pinion gear 41 is coupled to at least a portion of the speed-reducing mechanism 7. The rotor-shaft part 33 is coupled to the speed-reducing mechanism 7 via the pinion gear 41.

The speed-reducing mechanism 7 is disposed forward of the motor 6. The speed-reducing mechanism 7 couples the rotor-shaft part 33 and the spindle 8. The speed-reducing mechanism 7 transmits the rotation of the rotor 27 to the spindle 8. The speed-reducing mechanism 7 causes the spindle 8 to rotate at a rotational speed that is lower than the rotational speed of the rotor-shaft part 33. The speed-reducing mechanism 7 comprises a planetary-gear mechanism.

The speed-reducing mechanism 7 comprises a plurality of gears. The gears of the speed-reducing mechanism 7 are driven by the rotor 27.

The speed-reducing mechanism 7 comprises a plurality of planet gears 42 disposed around the pinion gear 41, and an internal gear 43, which is disposed around the plurality of planet gears 42. The pinion gear 41, the planet gears 42, and the internal gear 43 are each housed in the hammer case 4. Each of the planet gears 42 meshes with the pinion gear 41. The planet gears 42 are supported in a rotatable manner on the spindle 8 via respective pins 42P. The spindle 8 is rotated by the planet gears 42. The internal gear 43 has radially-inward facing teeth, which mesh with the radially-outward facing teeth of the planet gears 42. The internal gear 43 is fixed to the bearing box 24. The internal gear 43 is always non-rotatable relative to the bearing box 24.

When the rotor-shaft part 33 rotates in response to the operation (energization) of the motor 6, the pinion gear 41 rotates, and the planet gears 42 revolve around the pinion gear 41. The planet gears 42 revolve (orbit) around the pinion gear 41 while meshing with the radially-inward facing teeth of the internal gear 43. Owing to the revolving of the planet gears 42, the spindle 8, which is connected to the planet gears 42 via the pins 42P, rotates at a rotational speed that is lower than the rotational speed of the rotor-shaft part 33.

The spindle 8 is disposed more forward than at least a portion of the motor 6. The spindle 8 is disposed forward of the stator 26. At least a portion of the spindle 8 is disposed forward of the rotor 27. At least a portion of the spindle 8 is disposed forward of the speed-reducing mechanism 7. The spindle 8 is disposed rearward of the anvil 10. The spindle 8 is rotated by the rotor 27. The spindle 8 is rotated by the rotational force of the motor 6 transmitted by the speed-reducing mechanism 7. The spindle 8 transmits the rotational force of the motor 6 to the anvil 10.

The spindle 8 comprises a flange part 8A and a spindle-shaft part 8B, which protrudes forward from the flange part 8A. The planet gears 42 are supported in a rotatable manner by the flange part 8A via the pins 42P that extend rearward from the flange part 8A. The rotational axis of the spindle 8 and motor rotational axis AX of the motor 6 coincide with one another. The spindle 8 rotates about motor rotational axis AX. The spindle 8 is supported in a rotatable manner by a spindle bearing 44. A protruding part 8C is provided at a rear-end portion of the spindle 8. The protruding part 8C protrudes rearward from the flange part 8A. The protruding part 8C is disposed such that it surrounds the spindle bearing 44.

The bearing box 24 is disposed at least partially around the spindle 8. The spindle bearing 44 is held by the bearing box 24. The bearing box 24 has a protruding part 24B, which protrudes forward from a front surface of the bearing box 24. The spindle bearing 44 is disposed around the protruding part 24B.

The impact mechanism 9 is driven by the motor 6. The rotational force of the motor 6 is transmitted to the impact mechanism 9 via the speed-reducing mechanism 7 and the spindle 8. The impact mechanism 9 impacts the anvil 10 in the rotational direction owing to the rotational force of the spindle 8, which is rotated by the motor 6. The impact mechanism 9 comprises a hammer 47, balls 48, and a coil spring 49. The impact mechanism 9, which comprises the hammer 47, is housed in the hammer case 4.

The hammer 47 is disposed more forward than the speed-reducing mechanism 7. The hammer 47 is disposed around the spindle 8. The hammer 47 is held by the spindle 8. The balls 48 are disposed between the spindle 8 and the hammer 47. The coil spring 49 is supported by the spindle 8 and the hammer 47.

The hammer 47 has a tube shape. The hammer 47 is disposed around the spindle-shaft part 8B. The hammer 47 has a hole 47A, in which the spindle-shaft part 8B is disposed.

The hammer 47 is rotated by the motor 6. The rotational force of the motor 6 is transmitted to the hammer 47 via the speed-reducing mechanism 7 and the spindle 8. The hammer 47 is rotatable together with the spindle 8 owing to the rotational force of the spindle 8, which is rotated by the motor 6. The rotational axis of the hammer 47, the rotational axis of the spindle 8, and motor rotational axis AX of the motor 6 coincide with one another. The hammer 47 rotates about motor rotational axis AX.

The balls 48 are made of a metal such as steel. The balls 48 are disposed between the spindle-shaft part 8B and the hammer 47. The spindle 8 has a spindle groove 8D, in which at least some of the balls 48 are disposed. The spindle groove 8D is provided on a portion of an outer surface of the spindle-shaft part 8B. The hammer 47 has a hammer groove 47B, in which at least some of the balls 48 are disposed. The hammer groove 47B is provided on a portion of an inner surface of the hammer 47. The balls 48 are disposed between the spindle groove 8D and the hammer groove 47B. The balls 48 can roll along the inner side of the spindle groove 8D and the inner side of the hammer groove 47B. The hammer 47 is movable as the balls 48 roll. The spindle 8 and the hammer 47 can move relative to one another in the axial direction and the rotational direction within movable ranges defined by the spindle groove 8D and the hammer groove 47B.

The coil spring 49 generates an elastic (spring) force, which causes the hammer 47 to move forward. The coil spring 49 is disposed between the flange part 8A and the hammer 47. A recessed part 47C, which has a ring shape, is provided on a rear surface of the hammer 47. The recessed part 47C is recessed forward from the rear surface of the hammer 47. A washer 45 is provided on the inner side of the recessed part 47C. A rear-end portion of the coil spring 49 is supported by the flange part 8A. A front-end portion of the coil spring 49 is disposed on the inner side of the recessed part 47C and is supported by the washer 45. The coil spring 49 is preferably a compression spring.

The anvil 10 is disposed forward of the motor 6. The anvil 10 is the output portion of the power tool 1, which rotates in response to application of the rotational force of the rotor 27. At least a portion of the anvil 10 is disposed forward of the hammer 47. The anvil 10 has a tool (bit) hole 10A, into which a tool accessory, e.g., a bit, is inserted. The tool hole 10A is provided at a front-end portion of the anvil 10. The tool accessory is mounted on the anvil 10.

The anvil 10 has an anvil recessed part 10B. The anvil recessed part 10B is provided at a rear-end portion of the anvil 10. The anvil recessed part 10B recesses forward from a rear-end portion of the anvil 10. The spindle 8 is disposed rearward of the anvil 10. A front-end portion of the spindle-shaft part 8B is disposed in the anvil recessed part 10B.

The anvil 10 comprises an anvil-shaft part 101, which has a rod shape, and an anvil-projection part 102. The tool hole 10A is provided in a front-end portion of the anvil-shaft part 101. The tool accessory is mounted in (on) the anvil-shaft part 101. The anvil-projection part 102 is provided at a rear-end portion of the anvil 10. The anvil-projection part 102 projects outward in the radial direction from a rear-end portion of the anvil-shaft part 101.

The anvil 10 is supported in a rotatable manner by anvil bearings 46. The rotational axis of the anvil 10, the rotational axis of the hammer 47, the rotational axis of the spindle 8, and motor rotational axis AX of the motor 6 coincide with one another. The anvil 10 rotates about motor rotational axis AX. The anvil bearings 46 are disposed in the interior of the hammer case 4. The anvil bearings 46 are supported by the hammer case 4. In the embodiment, two of the anvil bearings 46 are disposed in the axial direction. The anvil bearings 46 support a front portion of the anvil-shaft part 101 in a rotatable manner. An O-ring 46A is disposed between the anvil bearings 46 and the anvil-shaft part 101.

At least a portion of the hammer 47 is capable of making contact with the anvil-projection part 102. A hammer-projection part 47D, which protrudes forward, is provided at a front portion of the hammer 47. The hammer-projection part 47D and the anvil-projection part 102 are capable of making contact with one another. In the state in which the hammer 47 and the anvil-projection part 102 are in contact with one another, the anvil 10 rotates together with the hammer 47 and the spindle 8 while the motor 6 is being energized (supplied with current).

The anvil 10 is impactable (strikable) in the rotational direction by the hammer 47. For example, during screw-tightening work, there are situations in which, when the load that acts on the anvil 10 becomes high, the anvil 10 can no longer be caused to rotate merely by the power generated by the motor 6. When the anvil 10 can no longer be caused to rotate merely by the power generated by the motor 6, the rotation of the anvil 10 and the hammer 47 will (temporarily) stop. As a result, the spindle 8 and the hammer 47 will move relative to one another in the axial direction and the circumferential direction via the balls 48. That is, even if the rotation of the hammer 47 (temporarily) stops, the rotation of the spindle 8 continues owing to the power generated by the motor 6. In the state in which the rotation of the hammer 47 has stopped, when the spindle 8 rotates relative to the hammer 47, the balls 48 move rearward while being guided by the spindle groove 8D and the hammer groove 47B. The hammer 47 receives a force from the balls 48 and moves rearward along with the balls 48. That is, in the state in which the rotation of the anvil 10 is stopped, the hammer 47 moves rearward in response to the relative rotation of the spindle 8. The contact between the hammer 47 and the anvil-projection part 102 is released by the movement of the hammer 47 rearward.

The coil spring 49 generates an elastic (spring) force, which causes the hammer 47 to move forward. The hammer 47, which had previously moved rearward, now moves forward owing to the elastic force of the coil spring 49. When the hammer 47 moves forward, it receives a force in the rotational direction from the balls 48. That is, the hammer 47 moves forward while rotating. When the hammer 47 moves forward while rotating, the hammer 47 makes contact with the anvil-projection part 102 while rotating. Thereby, the anvil-projection part 102 is impacted in the rotational direction by the hammer-projection part 47D of the hammer 47. Both the power of the motor 6 and the inertial force of the hammer 47 act on the anvil 10. Accordingly, the anvil 10 can be rotated about motor rotational axis AX with a higher torque.

The tool-holding mechanism 11 is disposed around a front portion of the anvil 10. The tool-holding mechanism 11 holds the tool accessory, which is inserted into the tool hole 10A.

The fan 12 is disposed rearward of the stator 26 of the motor 6. The fan 12 generates an airflow for cooling the motor 6 and may be, e.g., a centrifugal fan, an impeller, etc. The fan 12 is fixed to at least a portion of the rotor 27 so as to rotate together with the rotor 27. The fan 12 is fixed to a rear portion of the rear-side shaft part 33R via a bushing 12A. The fan 12 is disposed between the rear-side rotor bearing 39R and the stator 26. The fan 12 rotates when the rotor 27 rotates. When the rotor-shaft part 33 rotates, the fan 12 rotates together with the rotor-shaft part 33. When the fan 12 rotates, air from outside of the housing 2 flows into the interior space of the housing 2 via the air-intake ports 20A. The air that has flowed into the interior space of the housing 2 flows through the interior space of the housing 2, thereby cooling the motor 6. The air that has flowed through the interior space of the housing 2 flows out to the outside of the housing 2 via the air-exhaust ports 20B while the fan 12 is rotating.

The battery-mounting part 13 is disposed at a lower portion of the battery-holding part 23. The battery-mounting part 13 is connected to a battery pack 25. The battery pack 25 is mounted on the battery-mounting part 13. The battery pack 25 is detachable from the battery-mounting part 13. The battery pack 25 is mounted on the battery-mounting part 13 by the battery pack 25 being inserted into the battery-mounting part 13 from forward of the battery-holding part 23. The battery pack 25 is removed from the battery-mounting part 13 by being removed forward from the battery-mounting part 13. The battery pack 25 includes one or more secondary batteries. In the embodiment, the battery pack 25 includes one or more rechargeable lithium-ion batteries. After being mounted on the battery-mounting part 13, the battery pack 25 can supply electric power to the power tool 1. The motor 6 operates using the electric power (current) supplied from the battery pack 25. The operation-and-display part 16 operates using the electric power supplied from the battery pack 25. The control circuit board 19 operates using the electric power (current) supplied from the battery pack 25.

The trigger lever 14 is provided on the grip part 22. The trigger lever 14 is manipulated (pressed, squeezed) by the user to start the motor 6. The motor 6 is changed between operation (energization) and stoppage by manipulating the trigger lever 14.

The forward/reverse change lever 15 is provided at an upper portion of the grip part 22. The forward/reverse change lever 15 is manipulated (pressed) by the user. By manipulating the forward/reverse change lever 15, the rotational direction of the motor 6 is changed from one of the forward-rotational direction and the reverse-rotational direction to the other. By changing the rotational direction of the motor 6, the rotational direction of the spindle 8 is changed.

The operation-and-display part 16 is disposed at a rear portion of the battery-holding part 23. The operation-and-display part 16 is manipulated (e.g., pressed) by the user for the purpose of changing the application mode of the motor 6. The operation-and-display part 16 is not provided at the front portion, the left portion, or the right portion of the battery-holding part 23.

The mode-change switch 17 is provided at an upper portion of the trigger lever 14. The mode-change switch 17 can be manipulated (pressed) by the user to change the application mode of the motor 6.

The light assemblies 18 emit illumination light. The light assemblies 18 illuminate the anvil 10 and around the periphery of the anvil 10 with illumination light. The light assemblies 18 illuminate forward of the anvil 10 with illumination light. In addition, the light assemblies 18 illuminate the tool accessory, which is mounted on the anvil 10, and the periphery of the tool accessory with illumination light. In the embodiment, the light assemblies 18 are disposed at the left portion and the right portion of the hammer case 4.

The control circuit board 19 functions as a controller of the power tool 1, which controls at least the motor 6. The control circuit board 19 outputs control signals, which control the motor 6. The control circuit board 19 comprises a printed circuit board (PCB), on which a plurality of electronic parts is mounted. The electronic parts are installed on a surface 19S of the control circuit board 19. The surface 19S of the control circuit board 19 is oriented upward.

Illustrative examples of the electronic parts mounted on the printed circuit board include: a processor, such as a CPU (central processing unit); nonvolatile memory, such as ROM (read-only memory) and storage (e.g., flash memory); volatile memory, such as RAM (random-access memory); transistors; and resistors. The control circuit board 19 is housed in the battery-holding part 23. When the control circuit board 19 is disposed in a circuit-board case 19C, the control circuit board 19 is housed in the interior of the battery-holding part 23.

The control circuit board 19 changes the application mode of the motor 6 based on the work required to be performed by the power tool 1. The application mode of the motor 6 refers to the operation method or the operation pattern (e.g., a sequence of different rotational speeds) of the motor 6. The application mode of the motor 6 is changed by manipulating the operation-and-display part 16 and/or the mode-change switch 17.

As shown in FIG. 5, in the front-rear direction, a first distance G1, which is the distance between a front-end part 22A on a lower-end portion of the grip part 22 and a front-end part 23A of the battery-holding part 23, is shorter than or equal to a second distance G2, which is the distance between a rear-end part 22B of a lower-end portion of the grip part 22 and a rear-end part 23B of the battery-holding part 23.

As shown in FIG. 6, in the front-rear direction, a rear-end part 19B of the control circuit board 19 is disposed more rearward than the rear-end part 22B of the grip part 22.

As described above, electronic parts are installed on the surface 19S of the control circuit board 19. The surface 19S of the control circuit board 19 is oriented upward. The surface 19S of the control circuit board 19 is parallel to motor rotational axis AX.

Operation-and-Display Part

Figure 9:
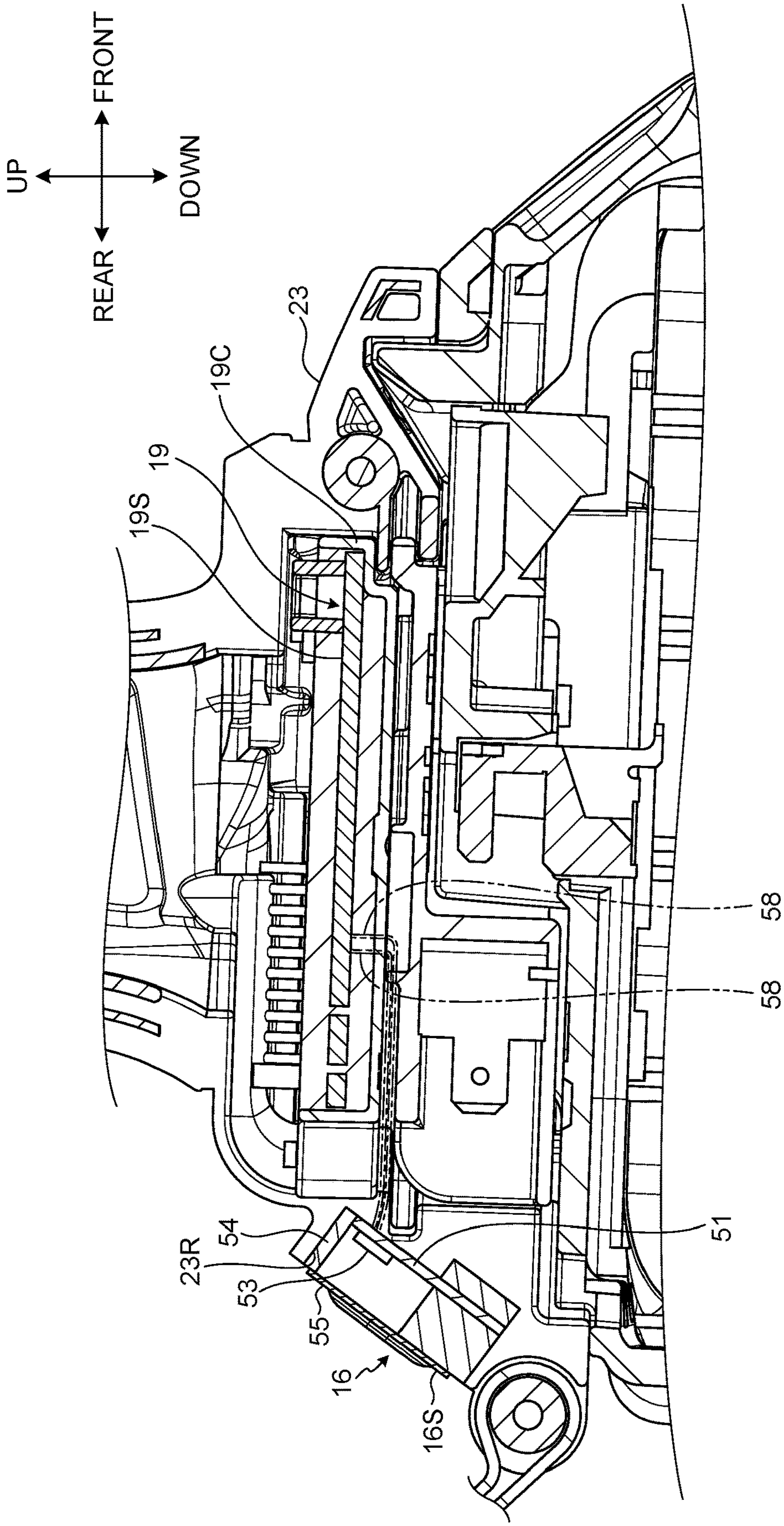
FIG. 9 is a longitudinal, cross-sectional view that shows a lower portion of the power tool according to the embodiment.
Figure 10:
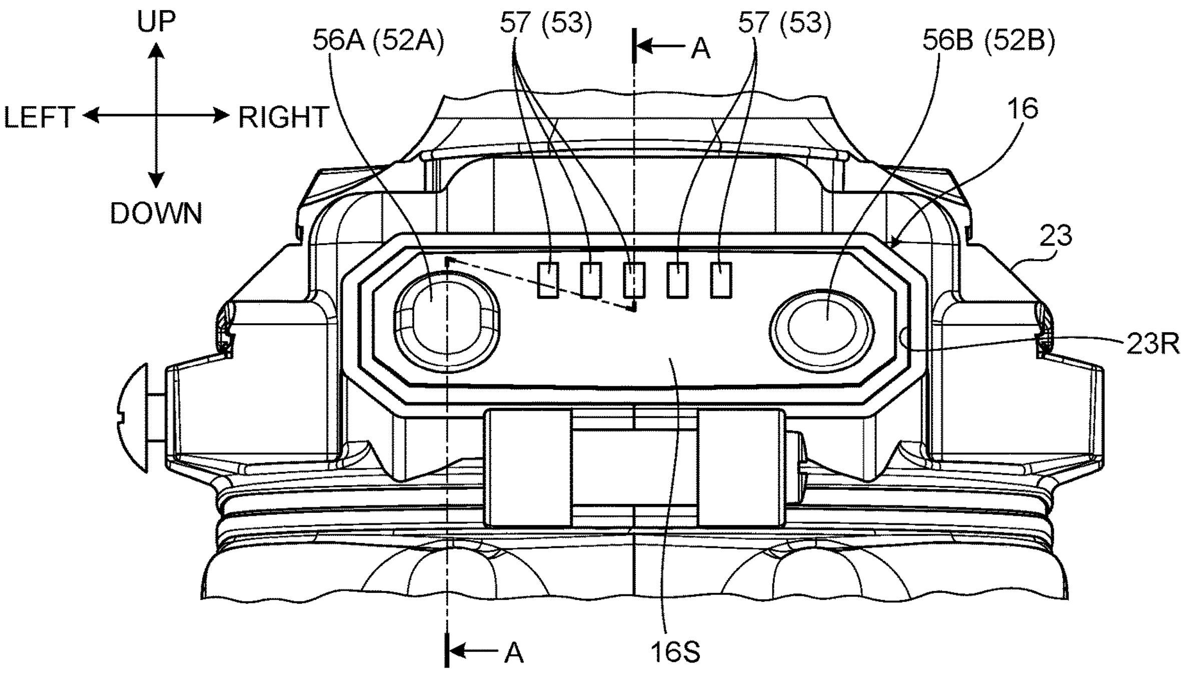
FIG. 10 is a rear view that shows a lower portion of the power tool according to the embodiment.
Figure 11:
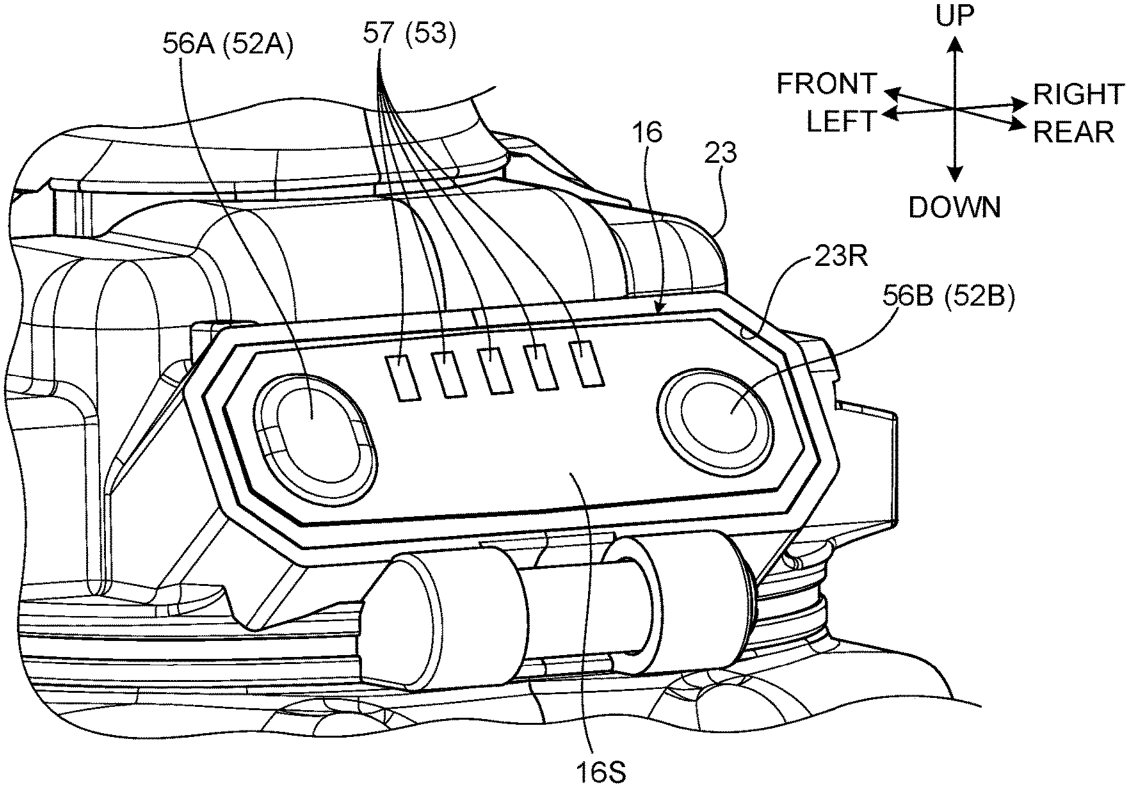
FIG. 11 is an oblique view, viewed from the rear, that shows the lower portion of the power tool according to the embodiment.
Figure 12:
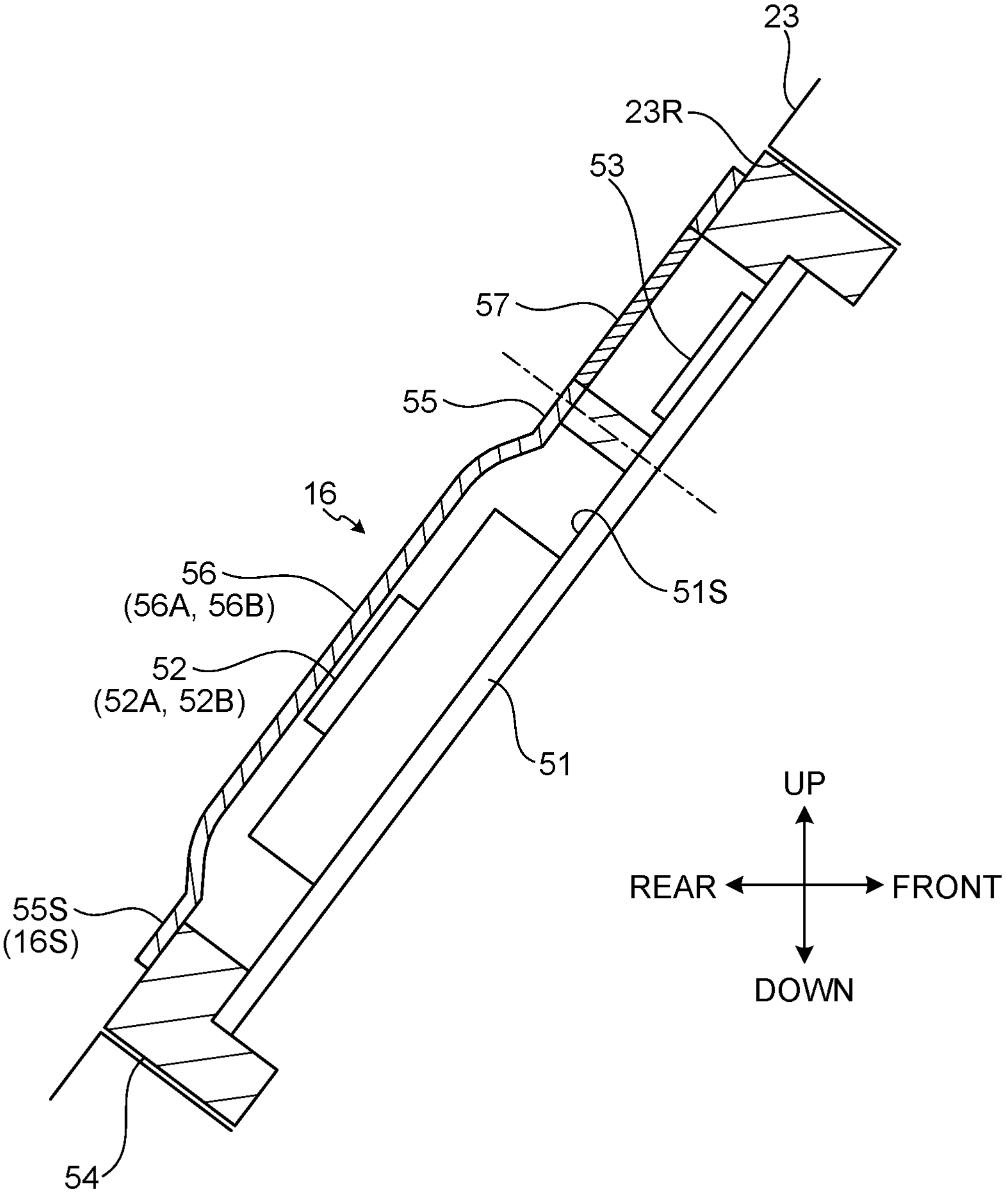
FIG. 12 is a cross-sectional view that shows an operation-and-display part of the power tool according to the embodiment.

FIG. 9 is a longitudinal, cross-sectional view that shows a lower portion of the power tool 1 according to the embodiment. FIG. 10 is a rear view that shows a lower portion of the power tool 1. FIG. 11 is an oblique view, viewed from the rear, that shows a lower portion of the power tool 1. FIG. 12 is a cross-sectional view that shows the operation-and-display part 16 of the power tool 1 and corresponds to an auxiliary, cross-sectional view taken along line A-A in FIG. 10.

The operation-and-display part 16 is disposed at a rear portion of the battery-holding part 23. The operation-and-display part 16 is disposed in a recessed part 23R, which is provided on the battery-holding part 23. The operation-and-display part 16 is disposed more rearward than the control circuit board 19. The operation-and-display part 16 is electrically connected to the control circuit board 19.

The operation-and-display part 16 comprises a circuit board 51, switch devices 52, light-emitting devices 53, a spacer member (spacer) 54, and a label member (label) 55.

The circuit board 51 comprises a printed circuit board (PCB), on which a plurality of electronic parts is mounted. The electronic parts are installed on a surface 51S of the circuit board 51. The surface 51S of the circuit board 51 is oriented upward and rearward. The surface 51S of the circuit board 51 is tilted downward as it goes rearward.

The switch devices 52 and the light-emitting devices 53 are each mounted on the circuit board 51. The switch devices 52 and the light-emitting devices 53 are each installed on the surface 51S of the circuit board 51.

The spacer member 54 supports the circuit board 51. The spacer member 54 is a frame-shaped member that is disposed around the circuit board 51. The spacer member 54 is disposed in the recessed part 23R, which is provided on the battery-holding part 23. The spacer member 54 is fixed to the battery-holding part 23. Therefore, the circuit board 51 is fixed to the battery-holding part 23 via the spacer member 54.

The circuit board 51, the switch devices 52, the light-emitting devices 53, and the spacer member 54 are each disposed in the interior of the battery-holding part 23.

The label member 55 is a plate-shaped member that is made of a synthetic resin (a bendable polymer). The label member 55 is disposed such that it covers the switch devices 52 and the light-emitting devices 53. A surface 16S of the operation-and-display part 16 includes a surface 55S of the label member 55. The surface 16S of the operation-and-display part 16 is oriented upward and rearward. The surface 16S of the operation-and-display part 16 is tilted downward as it goes rearward.

The switch devices 52 are manipulated via the label member 55. More specifically, the label member 55 comprises manipulatable parts 56, which are disposed directly above of the switch devices 52. Each of the manipulatable parts 56 includes an elastic-deformation portion that is provided at at least a portion of the label member 55. By pressing the manipulatable parts 56 of the label member 55, the user can manipulate the switch devices 52 via the label member 55. Thus, the manipulatable parts 56 function as buttons for respectively actuating the switch devices 52.

A plurality of the light-emitting devices 53 is disposed (arranged) in the left-right direction. In the embodiment, five of the light-emitting devices 53 are disposed in the left-right direction. Light-emitting diodes (LEDs) are illustrative examples of the light-emitting devices 53. Light emitted from the light-emitting devices 53 is emitted outward of the battery-holding part 23 via (through) the label member 55. The label member 55 comprises display parts 57, which are disposed directly above the light-emitting devices 53. Each of the display parts 57 comprises an optically transmissive portion, which is provided at at least a portion of the label member 55. The user can view the light-emitting states of the light-emitting devices 53 through the display parts 57.

In the embodiment, the switch devices 52 include a first switch device 52A and a second switch device 52B. The manipulatable parts 56 include a first manipulatable part (button) 56A, which is disposed directly above the first switch device 52A, and a second manipulatable part (button) 56B, which is disposed directly above the second switch device 52B.

When the first manipulatable part 56A is manipulated (pressed), the first switch device 52A is manipulated via the first manipulatable part 56A. When the second manipulatable part 56B is manipulated (pressed), the second switch device 52B is manipulated via the second manipulatable part 56B. The user can manipulate the switch devices 52 with one hand while holding the grip part 22 with the other hand.

In the embodiment, five of the display parts 57 are disposed in the left-right direction such that they correspond to the five light-emitting devices 53. Light emitted from the light-emitting devices 53 passes through the display parts 57, which are optically transmissive portions. The user can view the light-emitting states of the light-emitting devices 53 through the display parts 57.

As shown in FIG. 3 and FIG. 10, in the left-right direction, the center of the operation-and-display part 16 and the center of the battery-holding part 23 coincide. The center of the operation-and-display part 16 in the left-right direction includes the center of the label member 55 in the left-right direction.

The dimension of the operation-and-display part 16 in the left-right direction is larger than the dimension of the operation-and-display part 16 in the up-down direction. That is, the operation-and-display part 16 is elongated in the left-right direction. The dimension of the operation-and-display part 16 in the left-right direction includes the dimension of the label member 55 in the left-right direction. The dimension of the operation-and-display part 16 in the up-down direction includes the dimension of the label member 55 in the up-down direction.

In the embodiment, the first manipulatable part 56A is disposed at a left portion of the label member 55. The second manipulatable part 56B is disposed at a right portion of the label member 55. In the left-right direction, the display parts 57 are disposed between the first manipulatable part 56A and the second manipulatable part 56B.

As shown in FIG. 5 and FIG. 6, in the front-rear direction, the operation-and-display part 16 is disposed more rearward than the rear-end part 22B of the grip part 22. In the front-rear direction, the operation-and-display part 16 is disposed more rearward than a rear-end part 21B of the motor-housing part 21. In the front-rear direction, the operation-and-display part 16 is disposed more rearward than the rear cover 3.

In the embodiment, the application mode of the motor 6 is changed by manipulating (pressing) the switch device(s) 52 via the manipulatable part(s) 56. In the embodiment, the application modes of the motor 6 include impact-force modes, which are types of general-purpose modes, and dedicated modes (assist types), which are specially used in accordance with the fastener and/or workpiece material. In the embodiment, the impact-force modes can be switched by manipulating (pressing) the first switch device 52A. The dedicated modes can be switched by manipulating (pressing) the second switch device 52B.

As one example, the impact-force modes include a MAX mode, a HARD mode, a MEDIUM mode, and a SOFT mode. The dedicated modes (assist types) include a WOOD mode, a T mode (self-drilling screw mode), and a BOLT mode. The operation-and-display part 16 includes regions downward of the display parts 57, and these regions show characters, symbols, text, etc. that indicate information to be derived from the illumination of the respective light-emitting devices 53.

When the switch device(s) 52 is (are) manipulated via the manipulatable part(s) 56, the circuit board 51 generates an operation signal. As shown in FIG. 9, the circuit board 51 and the control circuit board 19 are connected via lead wires 58. The operation signal generated in the circuit board 51 is transmitted to the control circuit board 19 via at least one of the lead wires 58. The control circuit board 19 sets the application mode of the motor 6 based on the operation signal transmitted from the circuit board 51.

Figure 13:
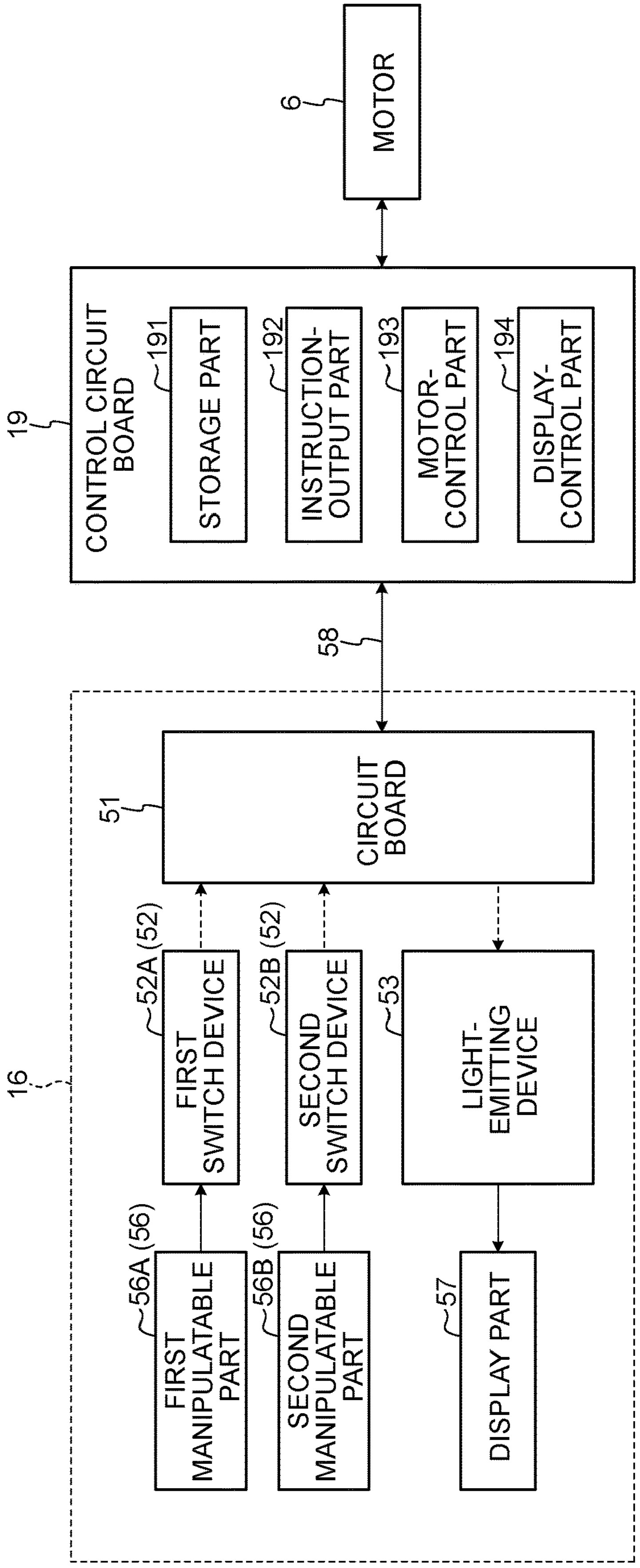
FIG. 13 is a block diagram that shows the power tool according to the embodiment.

As shown in FIG. 13, the control circuit board 19 comprises a storage part 191, an instruction-output part 192, a motor-control part 193, and a display-control part 194.

The storage part 191 stores software for executing the plurality of application modes (MAX mode, HARD mode, MEDIUM mode, SOFT mode, WOOD mode, T mode, and BOLT mode) of the motor 6.

When the manipulatable part(s) 56 of the operation-and-display part 16 is (are) manipulated, the instruction-output part 192 outputs a mode instruction, which sets the application mode. That is, the instruction-output part 192 outputs a mode instruction, which is for setting the application mode of the motor 6, based on the operation signal from the circuit board 51.

The motor-control part 193 outputs a motor-control signal, which controls the motor 6, based on the mode instruction output from the instruction-output part 192. The motor-control part 193 controls the motor 6 based on the application mode set by the manipulation of the manipulatable part(s) 56.

The display-control part 194 outputs a display-control signal, which controls the display parts 57 (the light-emitting devices 53) of the operation-and-display part 16, based on the mode instruction output from the instruction-output part 192. The display-control signal output from the display-control part 194 is transmitted to the circuit board 51 via at least one of the lead wires 58. The circuit board 51 controls the display parts 57 based on the display-control signal from the display-control part 194. The circuit board 51 causes the plurality of light-emitting devices 53 to operate with a light-emitting pattern corresponding to the application mode that was set.

Operation of the Impact Tool

Next, the operation of the power tool 1 will be explained. For example, when screw-tightening work is being performed on a work object (workpiece), a tool accessory (driver bit), which is to be used in the screw-tightening work, is inserted into the tool hole 10A of the anvil 10. The tool accessory inserted into the tool hole 10A is held by the tool-holding mechanism 11. After the tool accessory has been mounted on the anvil 10, the user grips the grip part 22 with, for example, their right hand, and pulls the trigger lever 14 with the index finger of their right hand. When the trigger lever 14 is pulled, electric power (current) is supplied from the battery pack 25 to the motor 6, the motor 6 operates (is energized), and at the same time the light assemblies 18 turn ON. When the motor 6 operates (is energized), the rotor-shaft part 33 of the rotor 27 rotates. When the rotor-shaft part 33 rotates, the rotational force of the rotor-shaft part 33 is transmitted to the planet gears 42 via the pinion gear 41. Because the planet gears 42 mesh with the radially-inward-facing teeth of the internal gear 43, the planet gears 42 revolve (orbit) around the pinion gear 41 while rotating around the respective pins 42P. As was noted above, the planet gears 42 are supported on the spindle 8 via the respective pins 42P in a rotatable manner. When the planet gears 42 are revolving (orbiting) around the pinion gear 41, the spindle 8 rotates at a rotational speed that is lower than the rotational speed of the rotor-shaft part 33.

When the hammer 47 contacts the anvil-projection part 102 and the spindle 8 rotates, the anvil 10 rotates together with the hammer 47 and the spindle 8. Owing to the rotation of the anvil 10, the screw-tightening work progresses.

However, when a load that is a prescribed value or greater acts on the anvil 10 during the progression of the screw-tightening work, the rotation of the anvil 10 and the hammer 47 stops temporarily. When the rotation of the hammer 47 has stopped and the spindle 8 rotates relative to the hammer 47, the hammer 47 moves rearward. In response to the rearward movement of the hammer 47, the contact between the hammer 47 and the anvil-projection part 102 is released. After the hammer 47 has moved rearward, the hammer 47 moves forward while rotating owing to the elastic force of the coil spring 49. When the hammer 47 moves forward while rotating relative to the anvil 10, the anvil 10 is impacted by the hammer 47 in the rotational direction. Thus, in this final phase of the screw-tightening work, the anvil 10 is intermittently impacted (struck) by the hammer 47, which causes the anvil 10 to be rotated about motor rotational axis AX at a higher torque. Consequently, a screw, bolt, etc. can be tightened in a work object (workpiece) at a higher torque.

If it is desired to change the application mode of the motor 6 during the screw-tightening work, the user can manipulate the manipulatable parts 56 of the operation-and-display part 16 while the front portion of the power tool 1 remains oriented toward the work object. That is, in the state in which the user grips the grip part 22 with, for example, their right hand, the user can manipulate the manipulatable parts 56 of the operation-and-display part 16 with their left hand, while maintaining their working posture using the power tool 1 and without pulling the power tool 1 rearward. In addition, when the application mode of the motor 6 has been changed, the display pattern of the display parts 57 (the light-emitting pattern of the light-emitting devices 53) changes. The user can view the display parts 57 of the operation-and-display part 16 while maintaining their working posture using the power tool 1 and without pulling the power tool 1 back toward them.

Effects

As explained above, the power tool 1 comprises: the motor 6 comprising the rotor 27, which rotates about motor rotational axis AX extending in the front-rear direction; the anvil 10, which is an output part that is disposed more forward than the motor 6 and is rotated by the rotational force of the rotor 27 (e.g., via the speed-reducing mechanism 7, spindle 8, impact mechanism 9, etc.); the housing 2 comprising: the motor-housing part 21, which houses the motor 6; the grip part 22, which extends downward from the motor-housing part 21; and the battery-holding part 23, which is connected at (to) a lower-end portion of the grip part 22; the control circuit board 19, which is housed in the housing 2; and an operation-and-display part 16, which is disposed at a rear portion of the housing 2 and is connected to the control circuit board 19.

With regard to the above-mentioned configuration, because the operation-and-display part 16 is disposed at a rear portion of the housing 2, a user can manipulate and view the operation-and-display part 16 while the front portion of the power tool 1 is oriented toward the work object. That is, while in a working posture in which the user uses the power tool 1 in the state in which the user grips the grip part 22 with their hand, the user can manipulate and view the operation-and-display part 16 without pulling the power tool 1 back toward them. Consequently, ease of operation and visibility of the operation-and-display part 16 can be improved. In addition, because the operation-and-display part 16 is disposed at a rear portion of the housing 2, there is no need to provide a region on the front portion of the housing 2 for the operation-and-display part 16. Accordingly, the weight balance of the power tool 1 can be improved.

In the embodiment, the operation-and-display part 16 is disposed at a rear portion of the battery-holding part 23.

With regard to the above-mentioned configuration, because the operation-and-display part 16 is disposed at a rear portion of the battery-holding part 23, a user can manipulate and view the operation-and-display part 16 while the front portion of the power tool 1 is oriented toward the work object. In addition, because the operation-and-display part 16 is disposed at a rear portion of the battery-holding part 23, there is no need to provide a region on the front portion of the battery-holding part 23 for the operation-and-display part 16. Accordingly, the weight balance of the power tool 1 can be improved.

In the embodiment, the operation-and-display part 16 is disposed in a recessed part 23R, which is provided on the battery-holding part 23.

With regard to the above-mentioned configuration, because the operation-and-display part 16 does not protrude from the surface of the battery-holding part 23, the user can easily handle the power tool 1.

In the embodiment, in a left-right direction, the center of the operation-and-display part 16 and the center of the battery-holding part 23 coincide.

With regard to the above-mentioned configuration, the weight balance of the power tool 1 in the left-right direction can be improved. In addition, the ease of operation and the visibility of the operation-and-display part 16 can be improved.

In the embodiment, the dimension of the operation-and-display part 16 in the left-right direction is larger than the dimension of the operation-and-display part 16 in an up-down direction.

With regard to the above-mentioned configuration, because the shape of the operation-and-display part 16 is elongated in the left-right direction, ease of operation and visibility of the operation-and-display part 16 can be improved.

In the embodiment, the operation-and-display part 16 is disposed more rearward than the rear-end part 22B of the grip part 22.

With regard to the above-mentioned configuration, the weight balance of the power tool 1 in the front-rear direction can be improved. In addition, the ease of operation and the visibility of the operation-and-display part 16 can be improved.

In the embodiment, the operation-and-display part 16 is disposed more rearward than the rear-end part 21B of the motor-housing part 21.

With regard to the above-mentioned configuration, the weight balance of the power tool 1 in the front-rear direction can be improved. In addition, the ease of operation and the visibility of the operation-and-display part 16 can be improved.

In the embodiment, the control circuit board 19 is housed in the battery-holding part 23.

With regard to the above-mentioned configuration, the distance between the operation-and-display part 16 and the control circuit board 19 is shortened. Consequently, the size and complexity of the connection structure between the operation-and-display part 16 and the control circuit board 19 can be minimized.

In the embodiment, the rear-end part 19B of the control circuit board 19 is disposed more rearward than the rear-end part 22B of the grip part 22.

With regard to the above-mentioned configuration, the weight balance of the power tool 1 in the front-rear direction can be improved.

In the embodiment, the operation-and-display part 16 is disposed more rearward than the control circuit board 19.

With regard to the above-mentioned configuration, because the operation-and-display part 16 and the control circuit board 19 do not overlap, the size of the battery-holding part 23 need not be increased, and the weight balance of the power tool 1 can be improved.

In the embodiment, the surface 16S of the operation-and-display part 16 tilts downward as it goes rearward.

With regard to the above-mentioned configuration, ease of operation and visibility of the operation-and-display part 16 can be improved.

In the embodiment, the operation-and-display part 16 comprises: the circuit board 51; the switch devices 52, which are installed on the circuit board 51; the light-emitting devices 53, which are installed on the circuit board 51; the spacer member 54, which supports the circuit board 51; and the label member 55, which covers the switch devices 52 and the light-emitting devices 53.

With regard to the above-mentioned configuration, the size of the operation-and-display part 16 need not be increased. In addition, ease of operation and visibility of the operation-and-display part 16 can be improved.

In the embodiment, the circuit board 51 is fixed to at least a portion of the housing 2 via the spacer member 54.

With regard to the above-mentioned configuration, the attachment of the operation-and-display part 16 and the housing 2 can be stabilized.

In the embodiment, the surface 51S of the circuit board 51 tilts downward as it goes rearward.

With regard to the above-mentioned configuration, the size of the operation-and-display part 16 need not be increased. In addition, ease of operation and visibility of the operation-and-display part 16 can be improved.

In the embodiment, the surface 19S of the control circuit board 19 is parallel to motor rotational axis AX.

With regard to the above-mentioned configuration, because the circuit board 51 and the control circuit board 19 are disposed such that they are oriented in differing directions, the size of the power tool 1 need not be increased.

In the embodiment, the power tool 1 comprises the lead wires 58 that electrically connect the control circuit board 19 and the circuit board 51.

With regard to the above-mentioned configuration, an operation signal, which is generated when, for example, the operation-and-display part 16 is manipulated, is transmitted to the control circuit board 19 via the lead wire(s) 58.

In the embodiment, the control circuit board 19 comprises: the storage part 191, which stores software (instructions) for executing the plurality of application modes of the motor 6; the instruction-output part 192, which outputs a mode instruction that sets the application mode in response the manipulatable part(s) 56 of the operation-and-display part 16 being manipulated; the motor-control part 193, which controls the motor 6 based on the mode instruction; and the display-control part 194, which controls the display part 57 of the operation-and-display part 16 based on the mode instruction.

With regard to the above-mentioned configuration, the application mode of the motor 6 is set by manipulating the manipulatable part(s) 56 of the operation-and-display part 16. In addition, the display parts 57 of the operation-and-display part 16 are controlled based on the mode instruction, and thereby the user can view the application mode of the motor 6 by looking at the display parts 57.

In the embodiment, in the front-rear direction, first distance G1 between the front-end part 22A of a lower-end portion of the grip part 22 and the front-end part 23A of the battery-holding part 23 is shorter than or equal to second distance G2 between the rear-end part 22B of a lower-end portion of the grip part 22 and the rear-end part 23B of the battery-holding part 23.

With regard to the above-mentioned configuration, because the grip part 22 is disposed at substantially the center of the battery-holding part 23 in the front-rear direction, the weight balance of the power tool 1 in the front-rear direction can be improved.

In the embodiment, the power tool 1 comprises: the battery-mounting part 13, which is disposed at a lower portion of the battery-holding part 23. The battery pack 25, which is inserted from forward of the battery-holding part 23, is mounted on the battery-mounting part 13.

With regard to the above-mentioned configuration, it becomes easy for the user to mount the battery pack 25 on the battery-mounting part 13. In addition, when the battery pack 25 is mounted on the battery-mounting part 13, the weight balance of the power tool 1 in the front-rear direction can be improved.

Examples of Dimensions of Impact Driver

Figure 14:
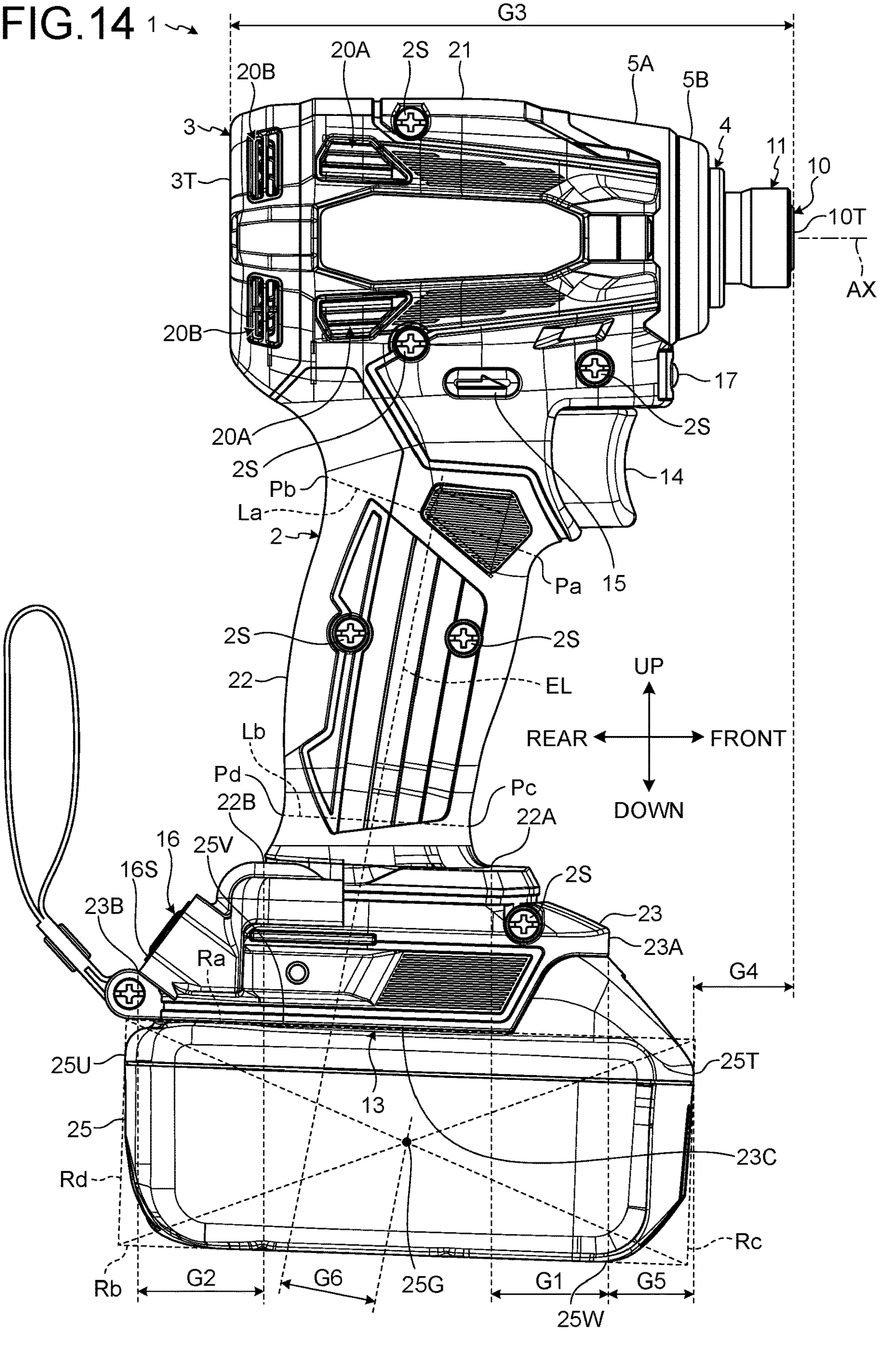
FIG. 14 is a right view that shows the power tool according to the embodiment.
Figure 15:
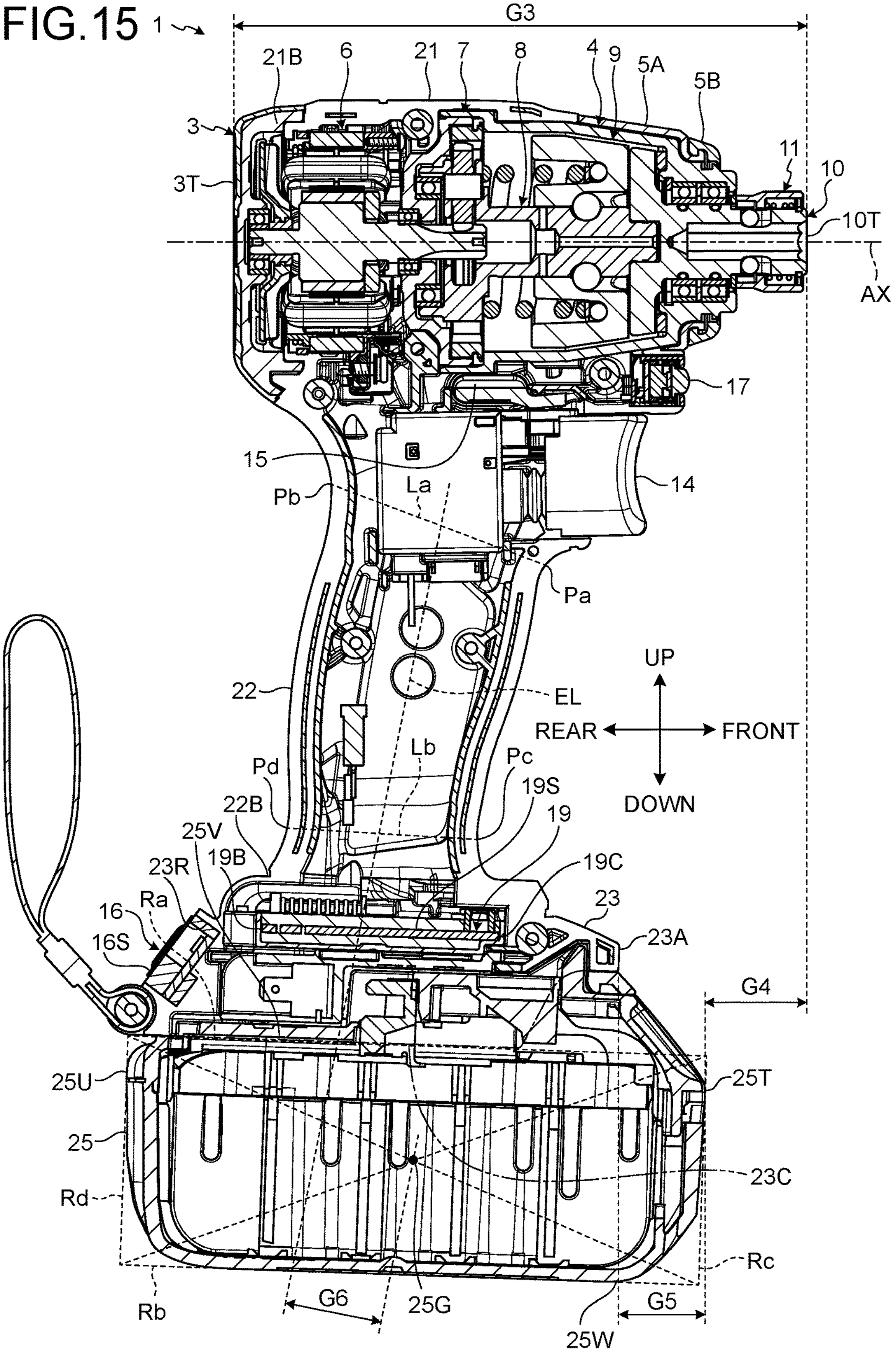
FIG. 15 is a longitudinal, cross-sectional view that shows the power tool according to the embodiment.

FIG. 14 is a right view that shows the power tool 1 according to the embodiment. FIG. 15 is a longitudinal, cross-sectional view that shows the power tool 1. FIG. 14 is equivalent to FIG. 5. FIG. 15 is equivalent to FIG. 6. In the explanation below, structural elements identical to those in the embodiment described above are assigned identical symbols, and explanations of those structural elements are simplified or omitted.

As described above, the power tool 1 is an impact driver. The power tool 1 comprises the housing 2, the rear cover 3, the hammer case 4, the hammer-case cover 5A, the bumper 5B, the motor 6, the speed-reducing mechanism 7, the spindle 8, the impact mechanism 9, the anvil 10, the tool-holding mechanism 11, the fan 12, the battery-mounting part 13, the trigger lever 14, the forward/reverse change lever 15, the operation-and-display part 16, the mode-change switch 17, the light assemblies 18, and the control circuit board 19.

The housing 2 comprises the motor-housing part 21, the grip part 22, and the battery-holding part 23. The rear cover 3 is disposed such that it covers the opening in the rear-end part of the motor-housing part 21. The motor-housing part 21 and the rear cover 3 function as a motor housing that houses the motor 6. The grip part 22 functions as a grip housing that extends downward from the motor housing. The battery-holding part 23 functions as a battery-holding housing that is disposed downward of the grip housing.

In the front-rear direction, distance G3, which extends from an end part 3T of the motor housing to a front-end part 10T of the anvil 10, is 120 mm or less. In the embodiment, the end part 3T of the motor housing refers to the end part 3T of the rear cover 3.

The lower-limit value of distance G3 is not particularly limited. As one example, the lower-limit value of distance G3 is 80 mm. That is, distance G3 may be 80 mm or more and 120 mm or less. It is noted that the lower-limit value of distance G3 may be 90 mm, may be 100 mm, or may be 110 mm. In the embodiment, distance G3 is approximately 114 mm.

The impact mechanism 9 comprises the hammer 47. The hammer 47 is disposed forward of the motor 6. The hammer 47 is rotated by the motor 6.

The anvil 10 is disposed forward of the hammer 47. The anvil 10 is impacted by the hammer 47 in the rotational direction.

The battery-mounting part 13 is disposed at a lower surface of the battery-holding part 23. The battery pack 25 is mounted on the battery-mounting part 13. The battery pack 25 is moved in the front-rear direction relative to the battery-holding part 23 and thereby is held by the battery-holding part 23. That is, the mounting/demounting system of the battery pack 25 relative to the battery-mounting part 13 is a slide system wherein the battery pack 25 is mounted on and demounted from the battery-holding part 23 by being slid substantially in the front-rear direction. The battery pack 25 is mounted on the battery-mounting part 13 by being inserted into the battery-mounting part 13 from forward of the battery-holding part 23. The battery pack 25 is demounted from the battery-mounting part 13 by being removed forward from the battery-mounting part 13. The battery pack 25 includes one or more secondary batteries. The battery pack 25 comprises one or more rechargeable lithium-ion batteries.

The rated voltage of the battery pack 25 is 18 V or higher. In the embodiment, the rated voltage of the battery pack 25 is 18 V. It is noted that the rated voltage of the battery pack 25 may be 36 V.

In the state in which the battery pack 25 is held by the battery-holding part 23, a front-end part 25T of the battery pack 25 is disposed more rearward than the front-end part 10T of the anvil 10.

In the state in which the battery pack 25 is held by the battery-holding part 23, the front-end part 25T of the battery pack 25 is disposed more forward than the front-end part 23A of the battery-holding part 23. That is, in the state in which the battery pack 25 is held by the battery-holding part 23, at least a portion of the battery pack 25 protrudes more forward than the battery-holding part 23.

In the front-rear direction parallel to rotational axis AX, distance G4, which extends from the front-end part 10T of the anvil 10 to the front-end part 25T, of the battery pack 25 is 10 mm or more.

The upper-limit value of distance G4 is not particularly limited. As one example, the upper-limit value of distance G4 is 50 mm. That is, distance G4 may be 10 mm or more and 50 mm or less. It is noted that the upper-limit value of distance G4 may be 40 mm, may be 30 mm, or may be 20 mm. In the embodiment, distance G4 is approximately 20 mm.

In the front-rear direction parallel to rotational axis AX, distance G5, which extends from the front-end part 23A of the battery-holding part 23 to the front-end part 25T of the battery pack 25, is 30 mm or less.

The lower-limit value of distance G5 is not particularly limited. As one example, the lower-limit value of distance G5 is 1 mm. That is, distance G5 may be 1 mm or more and 30 mm or less. It is noted that the lower-limit value of distance G5 may be 10 mm or may be 20 mm. In the embodiment, distance G5 is approximately 18 mm.

Shortest distance G6, which extends from extension line EL of the grip part 22, which is the grip housing, to a center of gravity 25G of the battery pack 25, is 20 mm or less. With regard to the battery pack 25, the center of gravity 25G of the battery pack 25 is disposed more forward than extension line EL.

Extension line EL refers to a line that passes through the midpoint of auxiliary line La, which is defined by an upper portion of the grip part 22, and the midpoint of auxiliary line Lb, which is defined by a lower portion of the grip part 22. Extension line EL is defined such that it passes through a longitudinal cross section of the power tool 1, which passes through rotational axis AX. Auxiliary line La and auxiliary line Lb are each defined such that it passes through a longitudinal cross section of the power tool 1, which passes through rotational axis AX.

Auxiliary line La refers to a line that connects extremal point Pa of the grip part 22, which exists at a front portion of an upper portion of the grip part 22, and extremal point Pb of the grip part 22, which exists at a rear portion of an upper portion of the grip part 22. Auxiliary line Lb refers to a line that connects extremal point Pc of the grip part 22, which exists at a front portion of a lower portion of the grip part 22, and extremal point Pd of the grip part 22, which exists at a rear portion of a lower portion of the grip part 22. The extremal points (Pa, Pb, Pc, Pd) of the grip part 22 are on the concave surface of the grip part 22.

The center of gravity 25G of the battery pack 25 refers to substantially the center of the outer shape of the battery pack 25 in a longitudinal cross section of the power tool 1, which passes through rotational axis AX. In greater detail, if the substantially outer shape of the battery pack 25 in a longitudinal cross section of the power tool 1, which passes through rotational axis AX, is regarded as an oblong shape, the center of gravity 25G of the battery pack 25 refers to the center of that oblong shape. As shown in FIG. 14, the oblong shape that defines substantially the outer shape of the battery pack 25 is formed by upper side Ra, lower side Rb, front side Rc, and rear side Rd. Upper side Ra is defined by the line of intersection between an upper surface 25V of the battery pack 25, which is adjacent to a lower-side part 23C of the battery-holding part 23, and the longitudinal cross section described above. Although upper side Ra is tilted relative to rotational axis AX, it extends substantially in the front-rear direction. Upper side Ra is disposed more downward than the lower-side part 23C of the battery-holding part 23 and is parallel to the lower-side part 23C. Lower side Rb is defined such that it passes through a lower-end part 25W of the battery pack 25 and is parallel to upper side Ra. Front side Rc is defined such that it passes through the front-end part 25T of the battery pack 25 and is orthogonal to upper side Ra and lower side Rb. Rear side Rd is defined such that it passes through a rear-end part 25U of the battery pack 25 and is orthogonal to upper side Ra and lower side Rb.

The lower-limit value of shortest distance G6 is not particularly limited. Shortest distance G6 may be 0 mm. That is, the center of gravity 25G may exist along extension line EL.

As explained above, because the front-end part 25T of the battery pack 25 is disposed more rearward than the front-end part 10T of the anvil 10 and because distance G4 from the front-end part 10T of the anvil 10 to the front-end part 25T of the battery pack 25 is 10 mm or more, the likelihood of contact of the front-end part 25T of the battery pack 25 with the work object is reduced when screw-tightening work is performed on the work object by the power tool 1. Thereby, work efficiency when using the power tool 1 can be improved.

In addition, because shortest distance G6 from along extension line EL of the grip part 22, which is the grip housing, to the center of gravity 25G of the battery pack 25 is 20 mm or less, the weight balance of the power tool 1 can be improved. Owing to the weight balance of the power tool 1 being improved, work efficiency when using the power tool 1 can be improved. In addition, user fatigue is lessened.

It is noted that, in the examples shown in FIG. 14 and FIG. 15, it was assumed that the front-end part 25T of the battery pack 25 is disposed more forward than the front-end part 23A of the battery-holding part 23. In the front-rear direction, the location of the front-end part 25T of the battery pack 25 and the location of the front-end part 23A of the battery-holding part 23 may be the same. The front-end part 25T of the battery pack 25 may be disposed more rearward than the front-end part 23A of the battery-holding part 23.

It is noted that, in the examples shown in FIG. 14 and FIG. 15, it was assumed that the motor housing comprises two members: the motor-housing part 21 of the housing 2 and the rear cover 3. The motor-housing part 21 and the rear cover 3 may be a single member. That is, the motor housing may be composed of one integral member.

It is noted that, in the examples shown in FIG. 14 and FIG. 15, it was assumed that the center of gravity 25G of the battery pack 25 is disposed more forward than extension line EL. With regard to the battery pack 25, the center of gravity 25G of the battery pack 25 may be disposed more rearward than extension line EL.

Modified Examples

In the embodiment described above, the control circuit board 19 is housed in the battery-holding part 23. However, the control circuit board 19 may instead be housed in the motor-housing part 21 or in the grip part 22.

The embodiment described above may be modified such that the control circuit board 19 and the circuit board 51 are integral (i.e. a single, continuous PCB). For example, the separate circuit board 51 may be omitted, and the control circuit board 19 may include the functions of the circuit board 51.

In the embodiment described above, the power tool 1 is an impact driver.

However, power tools according to the present teachings are not limited to being an impact driver. Illustrative examples of power tools according to the present teachings include a hammer, a hammer drill, a driver-drill, an angle drill, a grinder, a circular saw, and a reciprocating saw.

In the embodiment described above, the power supply of the power tool 1 does not have to be the battery pack 25 and may be a commercial power supply (AC power supply). In such a modified embodiment, a power cord may be provided with a plug that connects to the commercial power supply and a rectifier may be added to convert AC to DC for use in the power tool.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved power tools and impact drivers.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Although some aspects of the present disclosure have been described in the context of a device, it is to be understood that these aspects also represent a description of a corresponding method, so that each block or component of a device, such as the control circuit board 19 or circuit board 51, is also understood as a corresponding method step or as a feature of a method step. In an analogous manner, aspects which have been described in the context of or as a method step also represent a description of a corresponding block or detail or feature of a corresponding device, such as the control unit.

Depending on certain implementation requirements, exemplary embodiments of the control circuit board 19 or circuit board 51 of the present disclosure may be implemented in hardware and/or in software. The implementation can be configured using a digital storage medium, for example one or more of a ROM, a PROM, an EPROM, an EEPROM or a flash memory, on which electronically readable control signals (program code) are stored, which interact or can interact with a programmable hardware component such that the respective method is performed.

A programmable hardware component can be formed by a processor, a computer processor (CPU=central processing unit), an application-specific integrated circuit (ASIC), an integrated circuit (IC), a computer, a system-on-a-chip (SOC), a programmable logic element, or a field programmable gate array (FGPA) including a microprocessor.

The digital storage medium can therefore be machine- or computer readable. Some exemplary embodiments thus comprise a data carrier or non-transient computer readable medium which includes electronically readable control signals which are capable of interacting with a programmable computer system or a programmable hardware component such that one of the methods described herein is performed. An exemplary embodiment is thus a data carrier (or a digital storage medium or a non-transient computer-readable medium) on which the program for performing one of the methods described herein is recorded.

In general, exemplary embodiments of the present disclosure, in particular the control unit, are implemented as a program, firmware, computer program, or computer program product including a program, or as data, wherein the program code or the data is operative to perform one of the methods if the program runs on a processor or a programmable hardware component. The program code or the data can for example also be stored on a machine-readable carrier or data carrier. The program code or the data can be, among other things, source code, machine code, bytecode or another intermediate code.

A program according to an exemplary embodiment can implement one of the methods during its performing, for example, such that the program reads storage locations or writes one or more data elements into these storage locations, wherein switching operations or other operations are induced in transistor structures, in amplifier structures, or in other electrical, optical, magnetic components, or components based on another functional principle. Correspondingly, data, values, sensor values, or other program information can be captured, determined, or measured by reading a storage location. By reading one or more storage locations, a program can therefore capture, determine or measure sizes, values, variable, and other information, as well as cause, induce, or perform an action by writing in one or more storage locations, as well as control other apparatuses, machines, and components.

Therefore, although some aspects of the control circuit board 19 or circuit board 51 have been identified as "parts" or "steps", it is understood that such parts or steps need not be physically separate or distinct electrical components, but rather may be different blocks of program code that are executed by the same hardware component, e.g., one or more microprocessors, and/or may be implemented using discrete hardware components.

Additional embodiments disclosed herein include, but are not limited to:

1. An impact driver comprising:
- a motor;
- a hammer, which is disposed forward of the motor and is rotated;
- an anvil, which is disposed forward of the hammer and is impacted by the hammer;
- a motor housing, which houses the motor;
- a grip housing, which extends downward from the motor housing;
- a battery-holding housing, which is disposed downward of the grip housing; and
- a battery pack, which is held by being moved in a front-rear direction relative to the battery-holding housing and has a rated voltage of 18 V or higher;
- wherein the shortest distance from an extension line of the grip housing to the center of gravity of the battery pack is 20 mm or less.

2. The impact driver according to the above Aspect 1, wherein the center of gravity of the battery pack is disposed more forward than the extension line.

3. A power tool or impact driver according to any preceding embodiment or Aspect, wherein a main surface of the control circuit board is parallel to the motor rotational axis.

4. A power tool or impact driver according to any preceding embodiment or Aspect, further comprising at least one lead wire that electrically connects the control circuit board and the circuit board.

EXPLANATION OF THE REFERENCE NUMBERS

1 Power tool
2 Housing

2L Left housing
2R Right housing
2S Screw
3 Rear cover
3 S Screw
3T Rear-end part
4 Hammer case
5A Hammer-case cover
5B Bumper
6 Motor
7 Speed-reducing mechanism
8 Spindle
8A Flange part
8B Spindle-shaft part
8C Protruding part
8D Spindle groove
9 Impact mechanism
10 Anvil
10T Front-end part
10A Tool hole
10B Anvil recessed part
11 Tool-holding mechanism
12 Fan
12A Bushing
13 Battery-mounting part
14 Trigger lever
15 Forward/reverse change lever
16 Operation-and-display part
16S Surface
17 Mode-change switch
18 Light assembly
19 Control circuit board
19B Rear-end part
19C Circuit-board case
19S Surface
20A Air-intake port
20B Air-exhaust port
21 Motor-housing part
21B Rear-end part
22 Grip part
22A Front-end part
22B Rear-end part
23 Battery-holding part
23A Front-end part
23B Rear-end part
23C Lower-side part
23R Recessed part
24 Bearing box
24A Recessed part
24B Protruding part
25 Battery pack
25G Center of gravity
25T Front-end part
25U Rear-end part
25V Upper surface
25W Lower-end part
26 Stator
27 Rotor
28 Stator core
29 Front insulator
29S Screw
30 Rear insulator
31 Coil
32 Rotor-core part
33 Rotor-shaft part
33F Front-side shaft part
33R Rear-side shaft part
34 Rotor magnet
35 Sensor magnet
37 Sensor board
38 Fusing terminal
39 Rotor bearing
39F Front-side rotor bearing
39R Rear-side rotor bearing
41 Pinion gear
42 Planet gear
42P Pin
43 Internal gear
44 Spindle bearing
45 Washer
46 Anvil bearing
46A O-ring
47 Hammer
47A Hole
47B Hammer groove
47C Recessed part
47D Hammer-projection part
48 Ball
49 Coil spring
51 Circuit board
51S Surface
52 Switch device
52A First switch device
52B Second switch device
53 Light-emitting device
54 Spacer member
55 Label member
55S Surface
56 Manipulatable part
56A First manipulatable part
56B Second manipulatable part
57 Display part
58 Lead wire
101 Anvil-shaft part
102 Anvil-projection part
191 Storage part
192 Instruction-output part
193 Motor-control part
194 Display-control part
AX Motor rotational axis
EL Extension line
G1 First distance
G2 Second distance
G3 Distance
G4 Distance
G5 Distance
G6 Shortest distance
La Auxiliary line
Lb Auxiliary line
Pa Extremal point
Pb Extremal point
Pc Extremal point
Pd Extremal point
Ra Upper side
Rb Lower side
Rc Front side
Rd Rear side

What is claimed is:

1. A power screw-tightening tool comprising:

a motor including a rotor configured to rotate about a motor rotational axis extending in a front-rear direction;

a plurality of gears disposed more forward than the rotor and configured to be rotated in response to rotation of the motor;

an output part disposed more forward than the plurality of gears and configured to be rotated in response to rotation of the plurality of gears;

a housing including: a motor-housing part, which houses the motor; a grip part, which extends downward from the motor-housing part; and a battery-holding part, which is connected to a lower-end portion of the grip part;

a first circuit board, which is housed in the housing; and an operation-and-display part disposed at a rear portion of the battery-holding part and electrically connected to the first circuit board by a lead wire, the operation-and-display part including:

a second circuit board;

at least one switch device mounted on the second circuit board and configured to be manipulated by a user to select an application mode of the motor; and at least one light emitting device mounted on the second circuit board and configured to display the application mode selected by the user.

2. The power screw-tightening tool according to claim 1, wherein the operation-and-display part is disposed in a recessed part provided on the battery-holding part.

3. The power screw-tightening tool according to claim 1, wherein the center of the operation-and-display part and the center of the battery-holding part coincide in a left-right direction of the power tool.

4. The power screw-tightening tool according to claim 1, wherein the operation-and-display part has a larger dimension in a left-right direction of the power tool, which is perpendicular to the front-rear direction, than the dimension of the operation-and-display part in an up-down direction of the power tool, the up-down direction being perpendicular to the left-right direction and to the front-rear direction.

5. The power screw-tightening tool according to claim 1, wherein the operation-and-display part is disposed more rearward than a rear-end part of the grip part.

6. The power screw-tightening tool according to claim 1, wherein the operation-and-display part is disposed more rearward than a rear-end part of the motor-housing part.

7. The power screw-tightening tool according to claim 1, wherein the first circuit board is housed in the battery-holding part.

8. The power screw-tightening tool according to claim 7, wherein a rear-end part of the first circuit board is disposed more rearward than a rear-end part of the grip part.

9. The power screw-tightening tool according to claim 7, wherein the operation-and-display part is disposed more rearward than the first circuit board.

10. The power screw-tightening tool according to claim 1, wherein a surface of the operation-and-display part tilts downward as it goes rearward.

11. The power screw-tightening tool according to claim 1, wherein;

the operation-and-display part further comprises: a spacer member, which supports the second circuit board; and a label member, which covers the at least one switch device and the at least one light-emitting device; and the at least one switch device is manipulatable via the label member.

12. The power screw-tightening tool according to claim 11, wherein the second circuit board is fixed to at least a portion of the housing via the spacer member.

13. The power screw-tightening tool according to claim 11, wherein a surface of the second circuit board tilts downward as it goes rearward.

14. The power screw-tightening tool according to claim 1, wherein the first circuit board comprises:

a storage part, which stores software for executing a plurality of application modes of the motor;

an instruction-output part configured to output a mode instruction that sets the application mode in response to manipulation of the at least one switch device of the operation-and-display part;

a motor-control part configured to control the motor based on the mode instruction; and a display-control part configured to control a display part of the operation-and-display part based on the mode instruction.

15. The power screw-tightening tool according to claim 1, wherein, in the front-rear direction, a first distance between a front-end part of a lower-end portion of the grip part and a front-end part of the battery-holding part is shorter than or equal to a second distance between a rear-end part of a lower-end portion of the grip part and a rear-end part of the battery-holding part.

16. The power screw-tightening tool according to claim 1, further comprising:

a battery-mounting part disposed at a lower portion of the battery-holding part; and a battery pack mounted on the battery-mounting part and being mountable from forward of the battery-holding part.

17. The power screw-tightening tool according to claim 1, wherein:

the first circuit board is configured to drive the motor according to the user-selected application mode; and the user-selected application mode is one of:

an impact-force mode consisting of a MAX mode, a HARD mode, a MEDIUM mode and a SOFT mode; or a dedicated mode consisting of a WOOD mode, a self-drilling screw mode and a BOLT mode.

18. A power tool comprising:

a motor including a rotor configured to rotate about a motor rotational axis extending in a front-rear direction;

an output part disposed more forward than the motor and configured to be rotated in response to rotation of the rotor;

a housing including: a motor-housing part, which houses the motor; a grip part, which extends downward from the motor-housing part; and a battery-holding part, which is connected to a lower-end portion of the grip part;

a first circuit board disposed in the housing and configured to control operation of the motor; and an operation-and-display part disposed at a rear portion of the battery-holding part and electrically connected to the first circuit board by a lead wire, the operation-and-display part including: a second circuit board; at least one switch device mounted on the second circuit board and configured to be manipulated by a user to select an application mode of the motor; and at least one light emitting device mounted on the second circuit board and configured to display the application mode selected by the user;

wherein:

in the front-rear direction, a first distance between a front-end part of a lower-end portion of the grip part and a front-end part of the battery-holding part is shorter than or equal to a second distance between a rear-end part of a lower-end portion of the grip part and a rear-end part of the battery-holding part.

19. The power tool according to claim 18, wherein:

the first distance is between a frontmost point of a frontmost, lowermost edge of the grip part and a frontmost point of the battery-holding part, and the second distance is between a rearmost point of a rearmost, lowermost edge of the grip part and a rearmost point of the battery-holding part.

20. An impact tool comprising:

a motor including a rotor configured to rotate about a motor rotational axis extending in a front-rear direction;

a plurality of gears disposed more forward than the rotor in the front-rear direction and configured to be rotated in response to rotation of the rotor;

an anvil disposed more forward than the plurality of gears in the front-rear direction and configured to be rotated in response to rotation of the plurality of gears;

a housing including: a motor-housing part, which houses the motor; a grip part, which extends downward from the motor-housing part; and a battery-holding part, which is connected to a lower-end portion of the grip part;

a first circuit board housed in the battery holding part and configured to control the motor; and an operation-and-display part including:

a second circuit board;

at least one switch device mounted on the second circuit board and configured to be manipulated by a user to select an application mode of the motor; and at least one light emitting device mounted on the second circuit board and configured to display the application mode selected by the user, wherein:

the operation-and-display part is disposed at a rear portion of the battery-holding part and is electrically connected to the first circuit board by a lead wire, the first circuit board extends in a first plane, the second circuit board extends in a second plane, and the first and second planes are oblique to each other.

* * * * *